United States Patent
Kalabic et al.

(10) Patent No.: US 10,409,283 B2
(45) Date of Patent: Sep. 10, 2019

(54) VEHICLE MOTION CONTROL SYSTEM AND METHOD

(71) Applicant: Mitsubishi Electric Research Laboratories, Inc., Cambridge, MA (US)

(72) Inventors: Uros Kalabic, Jamaica Plain, MA (US); Udit Halder, Hyattsville, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 335 days.

(21) Appl. No.: 15/475,316

(22) Filed: Mar. 31, 2017

(65) Prior Publication Data

US 2018/0284782 A1 Oct. 4, 2018

(51) Int. Cl.
| | |
|---|---|
| *G01C 22/00* | (2006.01) |
| *G05D 1/02* | (2006.01) |
| *B60W 30/06* | (2006.01) |
| *B62D 15/02* | (2006.01) |
| *B60W 50/00* | (2006.01) |
| *B60W 10/20* | (2006.01) |
| *B60W 50/06* | (2006.01) |

(52) U.S. Cl.
CPC ............ *G05D 1/0212* (2013.01); *B60W 10/20* (2013.01); *B60W 30/06* (2013.01); *B60W 50/0098* (2013.01); *B62D 15/0285* (2013.01); *B60W 2050/0002* (2013.01); *B60W 2050/0013* (2013.01); *B60W 2050/0018* (2013.01); *B60W 2050/0034* (2013.01); *B60W 2050/065* (2013.01); *B60W 2540/04* (2013.01)

(58) Field of Classification Search
CPC ............... G05D 1/0212; B60W 10/20; B60W 50/0098; B60W 30/06; B60W 2540/04; B60W 2050/065; B60W 2050/0034; B60W 2050/0018; B60W 2050/0013; B60W 2050/0002; B62D 15/0285
USPC ...... 701/23, 25, 41, 400; 700/245, 255, 253; 318/600
See application file for complete search history.

(56) References Cited

U.S. PATENT DOCUMENTS

| | | | |
|---|---|---|---|
| 8,428,820 B2 | 4/2013 | Ottenhues et al. | |
| 8,700,307 B1 | 4/2014 | Zhao et al. | |
| 2016/0313373 A1 | 10/2016 | Plagne et al. | |

OTHER PUBLICATIONS

Thierry Fraichard, Alexis Scheuer. From Reeds and Shepp's to continuous-curvature paths. IEEE Transactions on Robotics, IEEE, 2004, 20 (6), pp. 1025-1035.

*Primary Examiner* — Shardul D Patel
(74) *Attorney, Agent, or Firm* — Gennadiy Vinokur; James McAleenan; Hironori Tsukamoto

(57) ABSTRACT

A motion of a vehicle is controlled according to a sequential compositions of the elementary paths following a transformation of one of a first pattern, a second pattern, and a third pattern. These three patterns are predetermined and form an exhaustive set of patterns. The three patterns are represented by corresponding functions stored in a memory. The functions representing the patterns are used, in response to receiving an initial state and a target state of the vehicle, to determine parameters of the minimum-curvature path. The motion of the vehicle is controlled according to the parameters of the minimum-curvature path.

20 Claims, 18 Drawing Sheets

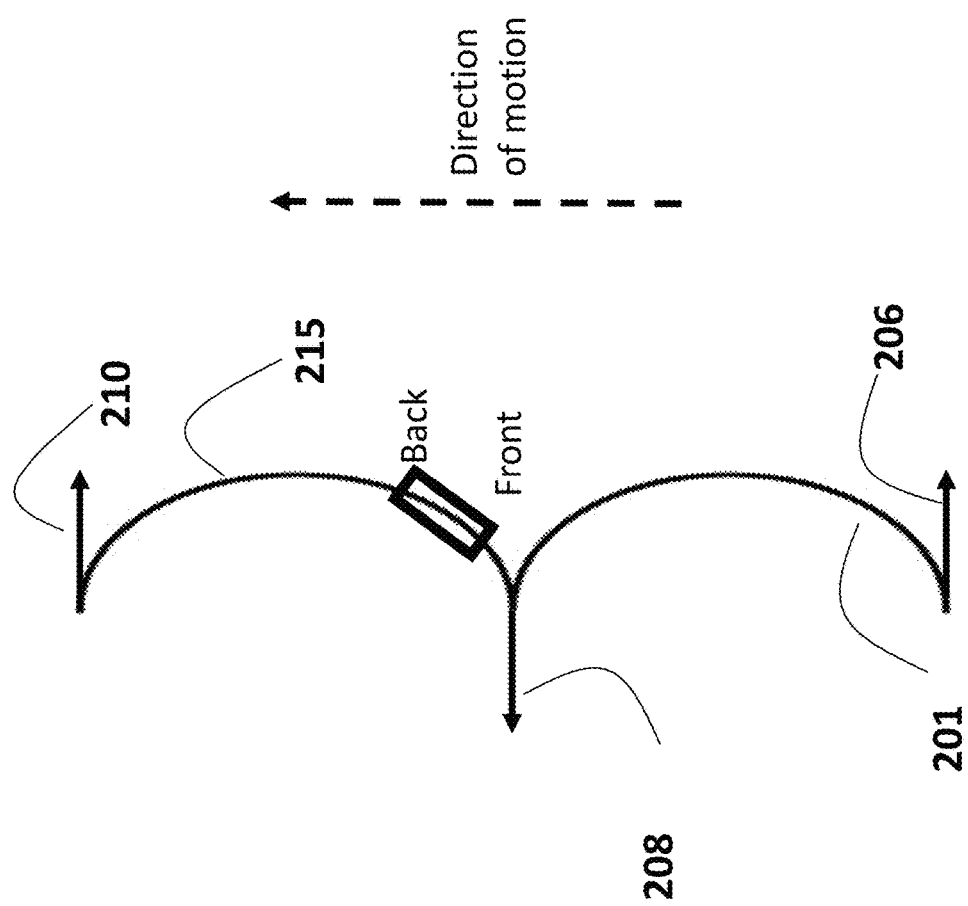

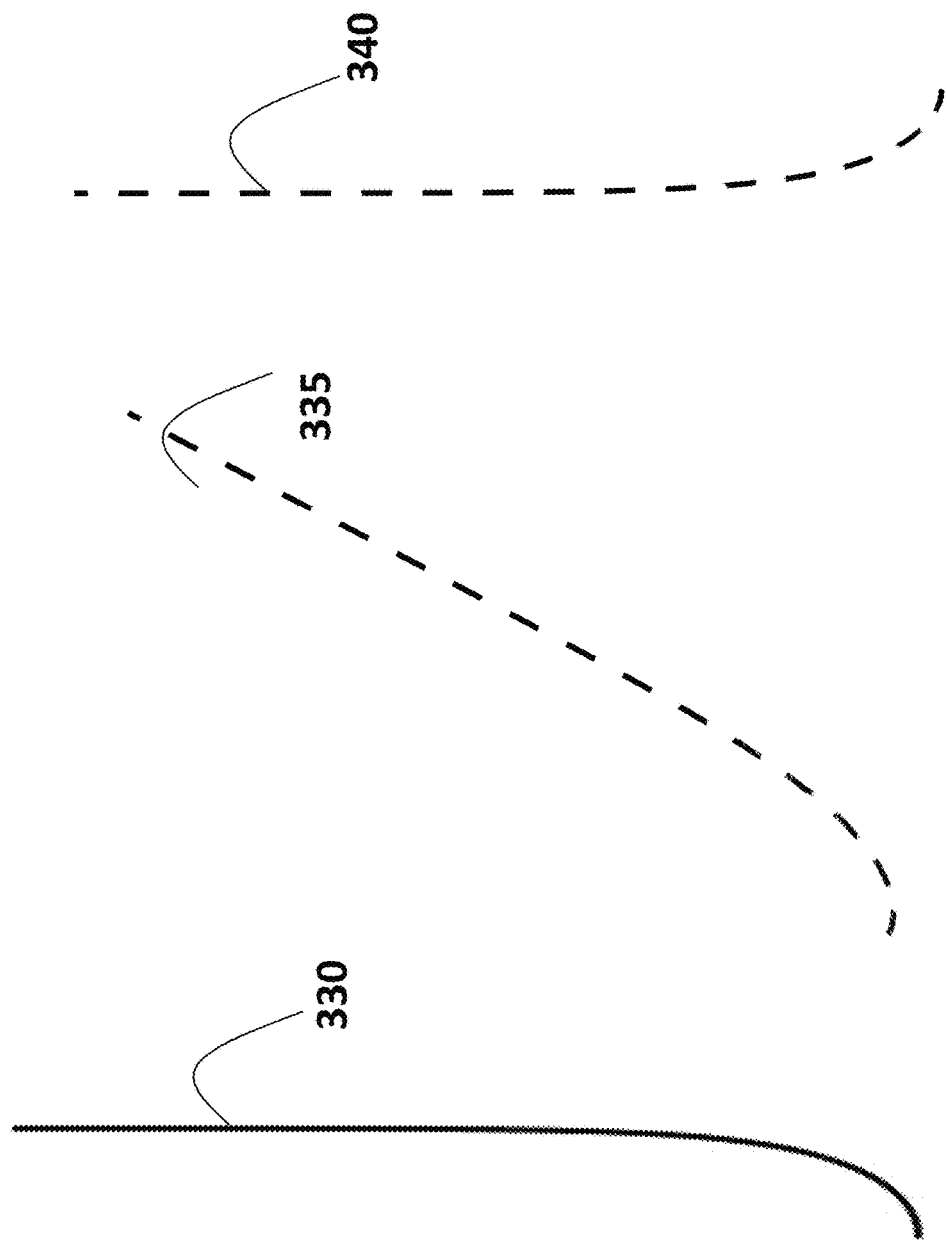

VEHICLE MOTION CONTROL SYSTEM AND METHOD

TECHNICAL FIELD

This invention relates generally to path planning of motion of the vehicles, and more particularly to path planning systems and methods for automatically controlling a motion of a vehicle between different states.

BACKGROUND

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The vehicle is controlled along the path that is a part of the object trajectory or, more precisely, the projection of the trajectory onto the two-dimensional plane of movement. To say it more figuratively, the path is the line connecting all geometrical coordinates of the moving vehicle.

A fundamental objective of path planning is to construct a trajectory connecting two states, e.g., an initial state and a target state, of a moving object, such as autonomous or semi-autonomous vehicles executing in autonomous-driving mode, and to control the motion of the vehicles along the trajectory. A "state" as used herein is a vector including the geometrical coordinates of the vehicle in the plane and an orientation of the vehicle at these geometrical coordinates. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

A path connecting an initial state and a target state is normally made up of several elementary paths (or EPT for short). In some situations, the path planning solely works with elementary paths of the same or different kinds. To that end, the path of a moving body is normally made up of a plurality of elementary paths that share the same junction points (abbreviating to JP). Thus, the junction points are special points of the path because each of them belongs to two adjoining elementary paths (EPT).

One special characteristic demanded of the paths is that states do not change erratically along the entire course or at the junction points. This is to say that the transition from one elementary path to an adjacent elementary path must be ensured to be continuous at the junction points of the elementary paths as well as at its first derivative (tangent) and its second derivative (curvature). The path is continuous at junction points when the transition from one elementary path to the adjacent elementary path can be performed by changing a steering of the vehicle in a linear manner and/or by switching a sign of a velocity of the vehicle.

For example, pioneering work Dubins and Reeds and Shepp investigated patterns of a shortest path between two states of the vehicle. The shortest path, termed Reeds-Shepp's (RS) path, is a sequential composition of line segments and/or tangential circular arcs of a minimum turning radius. The RS path can be computed in very efficient way, but the curvature along the RS path involving multiple segments is discontinuous. Such discontinuity of the curvature is undesirable in practice, since a vehicle has to stop and perform stationary steering, leading to unnecessary time delay and extra wearing of tires.

Some methods overcome discontinuity of the curvature in RS paths by introducing other segments, in addition to the line and circular segments. For example, the path planning can combine various types of elementary paths such as splines, polynomials, trigonometric functions or clothoids. The aforementioned elementary paths are mainly distinguished by their mathematical description. A feature that all elementary paths have in common is that they can be combined with straight and/or circular lines to form a continuous path.

Some conventional methods prefer to base its path planning on clothoids because they are closely related to the rules of movement of steered motor vehicles. A clothoid is a special type of plane curve that is marked by its curvature, c, changing in a linear manner. Clothoids have the added benefit of the length of the path being minimized when an initial state is connected with a terminal state. However, a continuous-curvature path typically includes a sequence of multiple elementary paths, and it can be difficult to find the parameters of the optimal sequence forming the continuous path.

For example, method described in U.S. 2016/03133735 first determines an RS path and tries to find a continuous-curvature path which stays as close as possible to the RS path. This method computes the continuous-curvature path by solving optimization problems with nonlinear equations. However, the solution to this method requires iterative process, which can be computationally prohibitive for a number of practical applications. Also, the optimization problem of that method is non-convex. The solution to the non-convex problem is not guaranteed, and thus the continuous-curvature path may not be constructed. Hence, this method may not be suitable for a real-time control of the vehicles. Similarly, the method described in U.S. Pat. No. 8,428,820 improves the computation efficiency, but still entails computationally expensive iterative process to construct the continuous path. Hence, this method also may not be suitable for a real time control of the vehicles.

Accordingly, there is a need to construct a continuous-curvature path for controlling a motion of a vehicle from an initial to a target state in a manner suitable for real-time control of the vehicles.

SUMMARY

It is an object of some embodiments to provide a path planning system and method to construct a continuous-curvature path connecting an initial state to a target state of a vehicle. It is another object of some embodiments to provide such a system and a method that are suitable for real-time control of the vehicles. As used herein, the continuous-curvature path is as a sequential composition of multiple elementary paths connected such that the transition from one elementary path to an adjacent elementary path is continuous in curvature at the junction points of the elementary paths as well as both its first derivative and second derivatives.

A continuous-curvature path connecting an initial and a target state of a vehicle can be formed by different sequences of the elementary paths. The sequential composition of types of elementary paths is referred herein as a pattern of elementary paths or just as a pattern. Each pattern used by various embodiments represents a continuous-curvature path. The pattern represents a continuous-curvature path connecting the initial and target states if the continuous-curvature path is a result of geometrical transformation of the pattern that preserves the structure of the pattern. Examples of the geometrical transformation include stretching, rotating, and flipping the elementary paths of the pattern. To that end, a pattern represents a continuous-curvature path if there exist some initial and target states and the geometrical parameters for the types of the elementary paths forming the pattern that result in the continuous-curvature path connecting the initial and target states.

Some embodiments are based on recognition that the Reeds-Shepp's (RS) path can be computed in an efficient way, but is discontinuous in curvature. Some embodiments are based on understanding that the RS path is discontinuous in curvature due to its optimization parameter minimizing the length of the path. Such a parameter of the optimization forces the resulting path to include a sequential composition of line segments and/or tangential circular arcs having discontinuous joint points.

Some embodiments are based on a realization that different optimization parameters can ensure that the optimization procedure provides a continuous-curvature path. Specifically, some embodiments determine a path connecting two states by minimizing the curvature of that path. Path curvature is directly proportional to the radial acceleration the vehicle experiences along the path. Path curvature is also directly proportional to the amount of abrasion experienced by a tire when turning. For example, following a zero curvature, straight-line path corresponds to zero radial abrasion, while turning a tire while stopped corresponds to an infinite value of curvature and maximum tire abrasion.

Some embodiments are based on realization that discontinuities in the curvature imply that the curvature is infinite at the points where discontinuities occur. To that end, the path with minimum curvature is guaranteed to have continuous curvature.

Some embodiments are based on yet another realization that if the minimization of the curvature of the path is performed for a fixed time, such an additional constraint on optimization can cause dramatic increases in the curvature of the resulting path. To avoid this problem, some embodiments consider minimization of the curvature of a path connecting initial and target states with free final time. For example, one embodiment minimizes the sum of a penalty on the elapsed time and a penalty on the total curvature of the path.

In general, the optimization of the curvature of the path with free final time can be solved using various optimization methods such as a shooting method with boundary conditions. However, shooting methods may not be solved analytically and iterative methods are used to find a solution. Such iterative optimization can be time consuming.

However, some embodiments realize that necessary conditions of the minimum-curvature optimization lead to two constants of motion, i.e., the Hamiltonian and the Casimir constants. When the final time is free, the Hamiltonian constant is zero due to time optimality and the values of the Casimir constant leads to three possible patterns of solutions, referred herein as a first pattern, a second pattern, and a third pattern.

The first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state. The second pattern defines the motion of the vehicle from a fourth state to a fifth state while moving left, wherein the orientation of the fifth state is leftward perpendicular to the orientation of the fourth state. The third pattern defines a forward motion of the vehicle from a sixth state to a seventh state while turning first left and then right followed by a backward motion of the vehicle from the seventh state to an eighth state while turning first right and then left followed by a forward motion of the vehicle from the eighth state to a ninth state while turning first left and then right, wherein the orientation of the sixth state equals the orientation of the seventh state and equals the orientation of the eighth state and equals the orientation of the ninth state.

Some embodiments are based on recognition that these three patterns form an exhaustive set of patterns. As used herein, a set of patterns is jointly or collectively exhaustive, if for any values of the initial and target states, there is at least one pattern that represents a feasible continuous path connecting the initial and target states without consideration of the obstacles. To that end, the minimum-curvature optimization can be simplified by testing those three types of patterns to form a path connecting an initial state and a target state. When there is a plurality of paths with the structure represented by one of these three patterns, some embodiments select from the plurality the continuous path with the minimum curvature.

For example, one embodiment uses a set of cost functions corresponding to the set of analytical functions. Each cost function, in response to receiving values of the initial and the target states, returns a value of a curvature of a continuous path determined by a corresponding analytical function to connect the initial and the target states. The embodiment tests all cost functions for the values of the initial and the target states and selects the function corresponding to the pattern or a cost function with minimum value. The selected function is used to produce the minimum-curvature path.

Accordingly, one embodiment discloses a system for controlling a motion of a vehicle. The system includes a memory to store a set of functions corresponding to a set of patterns of elementary paths, each pattern represents a minimum-curvature path and each function is determined for a corresponding pattern to provide a solution for input states of the vehicle defining a minimum-curvature path connecting the input states by a sequential compositions of the elementary paths following a transformation of the corresponding pattern, wherein the set of patterns includes a first pattern, a second pattern, and a third pattern. The first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state. The second pattern defines the motion of the vehicle from a fourth state to a fifth state while moving left, wherein the orientation of the fifth state is leftward perpendicular to the orientation of the fourth state. The third pattern defines a forward motion of the vehicle from a sixth state to a seventh state while turning first left and then right followed by a backward motion of the vehicle from the seventh state to an eighth state while turning first right and then left followed by a forward motion of the vehicle from the eighth state to a ninth state while turning first left and then right, wherein the orientation of the sixth state equals the orientation of the seventh state and equals the orientation of the eighth state and equals the orientation of the ninth state; a path planner to select from the memory, in response to receiving an initial state and a target state of the vehicle, the function corresponding to a minimum curvature of a path connecting the initial state with the target state and to determine parameters of the minimum curvature path using the selected function; and a controller to control the motion of the vehicle according to the parameters of the minimum-curvature path.

Another embodiment discloses a method for controlling a motion of a vehicle, wherein the method uses a processor coupled with stored instructions implementing the method, wherein the instructions, when executed by the processor carry out at least some steps of the method. The method includes receiving an initial state and a target state of the vehicle; selecting, from a set of functions corresponding to a set of patterns of elementary paths, a function corresponding to a minimum curvature of a path connecting the initial state with the target state, wherein each pattern represents a minimum-curvature path and each function is determined for a corresponding pattern to provide a solution for input states of the vehicle defining a minimum-curvature path connecting the input states by a sequential compositions of the elementary paths following a transformation of the corresponding pattern, wherein the set of patterns includes a first pattern, a second pattern, and a third pattern, wherein the first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state. The second pattern defines the motion of the vehicle from a fourth state to a fifth state while moving left, wherein the orientation of the fifth state is leftward perpendicular to the orientation of the fourth state. The third pattern defines a forward motion of the vehicle from a sixth state to a seventh state while turning first left and then right followed by a backward motion of the vehicle from the seventh state to an eighth state while turning first right and then left followed by a forward motion of the vehicle from the eighth state to a ninth state while turning first left and then right, wherein the orientation of the sixth state equals the orientation of the seventh state and equals the orientation of the eighth state and equals the orientation of the ninth state; determining parameters of the minimum-curvature path using the selected function; and controlling the motion of the vehicle according to the parameters of the minimum-curvature path.

Yet another embodiment discloses a non-transitory computer readable storage medium embodied thereon a program executable by a processor for performing a method. The method includes receiving an initial state and a target state of the vehicle; selecting, from a set of functions corresponding to a set of patterns of elementary paths, a function corresponding to the minimum curvature of a path connecting the initial state with the target state, wherein each pattern represents a continuous path and each function is determined for a corresponding pattern to provide a solution for input states of the vehicle defining a path connecting the input states by a sequential compositions of the elementary paths following a transformation of the corresponding pattern, wherein the set of patterns includes a first pattern, a second pattern, and a third pattern, wherein the first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state. The second pattern defines the motion of the vehicle from a fourth state to a fifth state while moving left, wherein the orientation of the fifth state is leftward perpendicular to the orientation of the fourth state. The third pattern defines a forward motion of the vehicle from a sixth state to a seventh state while turning first left and then right followed by a backward motion of the vehicle from the seventh state to an eighth state while turning first right and then left followed by a forward motion of the vehicle from the eighth state to a ninth state while turning first left and then right, wherein the orientation of the sixth state equals the orientation of the seventh state and equals the orientation of the eighth state and equals the orientation of the ninth state; determining parameters of the minimum-curvature path using the selected function; and controlling the motion of the vehicle according to the parameters of the minimum-curvature path.

BRIEF DESCRIPTION OF THE DRAWINGS

FIG. 2A shows a first pattern representing a minimum curvature path according to some embodiments.

FIG. 3B shows examples of transformations of the second pattern used by some embodiments to determine the minimum-curvature path.

DETAILED DESCRIPTION

Figure 1A:
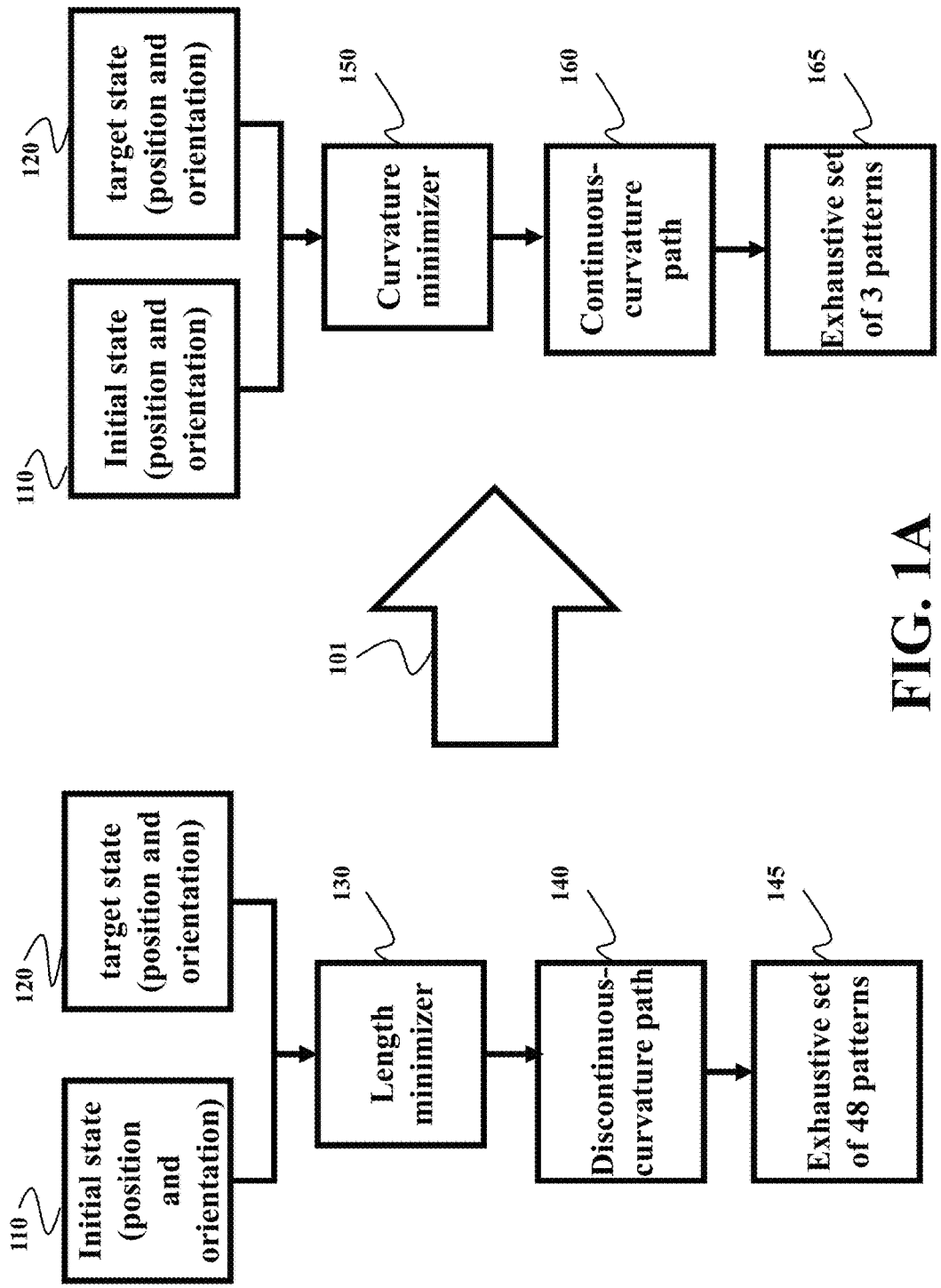
FIG. 1A shows a schematic of an optimization transformation used by some embodiments for determining a continuous-curvature path between two input states of a vehicle.

FIG. 1A shows a schematic of an optimization transformation 101 used by some embodiments for determining a continuous-curvature path between two input states of a vehicle. As used herein, each state of the vehicle includes at least position and an orientation of the vehicle. Specifically, some embodiments are based on realization that Reeds-Shepp's (RS) path is discontinuous in curvature due to its optimization parameter 130 minimizing the length of the path connecting an initial state 110 with a target state 120 of a vehicle. Such a parameter of the optimization causes the resulting path 140 to include a sequential composition of line segments and tangential circular arcs having discontinuous-curvature joint points. However, different optimization parameters can result in a continuous-curvature path. Specifically, some embodiments determine a path connecting two states 110 and 120 by minimizing a curvature 150 of that path. Discontinuity of the path curvature increases its curvature, e.g., at the discontinuous-curvature junction points, the value of the curvature is infinite. To that end, the path 160 with minimum-curvature, if it exists, is guaranteed to be continuous.

Some embodiments are based on another realization that if the minimization of the curvature of the path is performed for a fixed time, such an additional constraint on optimization can cause dramatic increases in the curvature of the resulting path. To avoid this problem, some embodiments consider minimization of the curvature of a path connecting initial and target states with free final time, which can be solved with a variety of iterative optimization methods not necessarily suitable for run-time control of the motion of the vehicle.

Some embodiments are based on yet another realization that necessary conditions of the minimum-curvature optimization lead to two constants of motion, i.e., the Hamiltonian and the Casimir constants. When the time is free, the Hamiltonian constant is zero due to time optimality and the values of the Casimir constant lead to three possible patterns of solutions.

Some embodiments are based on recognition that these three patterns form an exhaustive set of patterns 165, as contrasted with 48 patterns 145 forming the exhaustive set of patterns for RS paths. As used herein, a set of patterns is jointly or collectively exhaustive, if for any values of the initial and target states, there is at least one pattern that represents a feasible minimum-curvature path connecting the initial and target states without consideration of the obstacles. For example, the RS path can have up to 48 driving patterns, further categorized as 12 classes.

To that end, the minimum-curvature optimization can be simplified by testing those three types of patterns to form a continuous-curvature path connecting an initial state and a target state. When there is a plurality of paths with the structure represented by one of these three patterns, some embodiments select from the plurality the path with the minimum curvature.

Figure 1B:
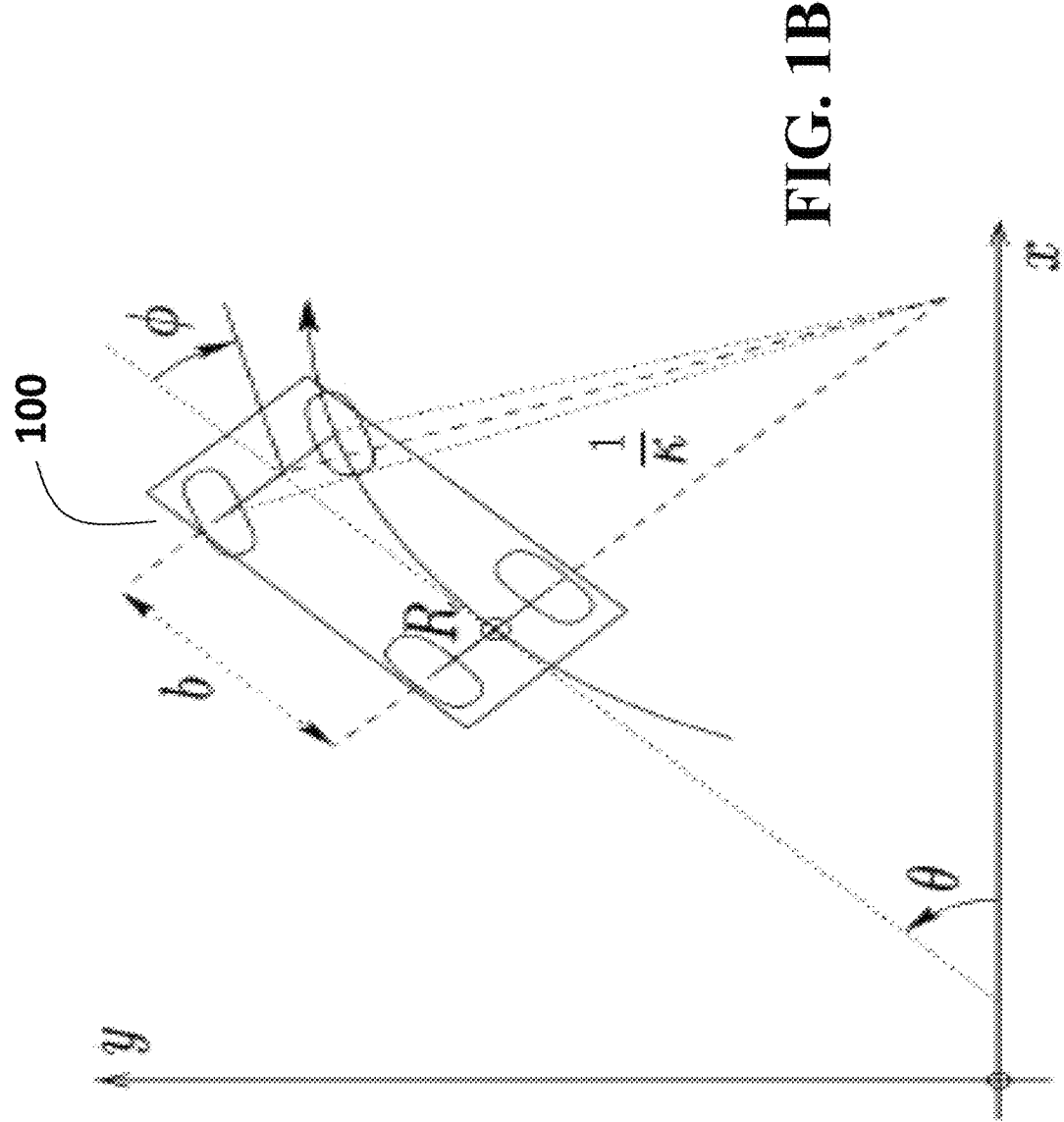
FIG. 1B shows a schematic of a vehicle equipped with a front-fixed steering wheel and fixed parallel rear wheels as used by some embodiments.

FIG. 1B shows a schematic of a vehicle 100 equipped with a front-fixed steering wheel and fixed parallel rear wheels as used by some embodiments. A point R is located at the mid of rear wheels of the vehicle. A configuration of the vehicle is uniquely described by a triple $(x, y, \theta)$ where the pair $(x, y)$ represents the coordinates of R in a fixed frame and $\theta$ is an orientation angle of the vehicle with respect to the positive x-axis of the same fixed frame. The vehicle has a wheelbase b, and a steering angle $\phi$. A simplified kinematic model, often referred to as the unicycle model, of the vehicle is given by $$\begin{bmatrix} \dot{x} \\ \dot{y} \\ \dot{\theta} \end{bmatrix} = \begin{bmatrix} \cos\theta \\ \sin\theta \\ 0 \end{bmatrix} v + \begin{bmatrix} 0 \\ 0 \\ 1 \end{bmatrix} \kappa \quad (1)$$

where the control inputs are $v$ and $\kappa$. Given some initial condition for the configuration parameters $(x, y, \theta)$ and a time history of $v$ and $\kappa$, one can uniquely determine how the pair $(x, y)$ changes in time. The sequence of points from the initial time to some final time is called the path. The control inputs represent properties of the path: $v$ is the tangential velocity along the path, which is in practice is related to the driving velocity of the wheels of the vehicle, and $\kappa$ is the path curvature, which is in practice related to the angles of the vehicle wheels.

The goal is to minimize the curvature of a path connecting an initial configuration at an initial time $t_i$ to a desired, final configuration at time $t_f$, where these two configurations cannot be connected by a straight line. Curvature depends on the magnitude of velocity, e.g., a curvature on a path is more severe at higher speeds. Therefore, to keep curvature consistent along all points on the path, the speed along the path $|v|$, which is equal to the magnitude of the velocity $v$, is fixed and only its sign may vary. For ease of exposition, here we take $|v|=1$, but the method applies to any fixed value of $|v|$. The total running time, which is equal to $t_f-t_i$ is free, i.e., it also has to be optimized. Mathematically, this amounts to the minimization of some penalty function that is a linear combination of a penalty on time and a penalty on the curvature. The penalty function is given by $$\int_{t_i}^{t_f} a + \kappa \, dt$$

where the term a is a constant penalty weight that determines how much to penalize the final time, i.e., the higher the weight a, the faster the resulting path will be. Note that a cannot be zero because this would make it possible to have an infinitely long path and that path would just be a straight line with zero curvature which is not a solution since it does not in general connect any two configurations. For ease of exposition, here we take a=1 but the method applies to any value of a.

Solving this problem analytically, we obtain the following values for the control inputs $v$ and $\kappa$ $$v = \text{sign } \mu_2$$

$$u = \mu_1$$

where the sign function returns the sign of the variable, in this case $\mu_2$. The variable $\mu_1$ and $\mu_2$ are variables which, along with a variable $\mu_3$ adhere to the dynamics $$\dot{\mu}_1 = -\mu_3 \text{ sign } \mu_2$$

$$\dot{\mu}_2 = \mu_1 \mu_3$$

$$\dot{\mu}_3 = -\mu_1 \mu_2 \quad (2)$$

The dynamics in (2) have two constant of motion: the Hamiltonian h and the Casimir c where $$h = \tfrac{1}{2}\mu_1^2 + |\mu_2| - \tfrac{1}{2} \quad (3)$$

$$c = \mu_2^2 + \mu_3^2 \quad (4)$$

According to (3), $\mu_2$ is restricted to be between $\pm\frac{1}{2}$ and, according to (4), $\mu_2$ is restricted to be between $\pm\sqrt{c}$. These two facts imply that (a) when c is less than $\frac{1}{4}$, $\mu_1$ does not change sign, (b) when c is greater than $\frac{1}{4}$, $\mu_3$ does not change sign, and (c) when c is equal to $\frac{1}{4}$, a change in sign is possible. These three categorizations (c<$\frac{1}{4}$, c=$\frac{1}{4}$, and c>$\frac{1}{4}$) correspond to three types of patterns forming an exhaustive set.

Some embodiments are based on realization that those three different values of the Casimir constant can reduce the search space of the desired solution. Based on some experiments and observations, it is realized that different values of the Casimir constant also impose different patterns on the orientation of the vehicle following minimal curvature path. In such a manner, instead of searching the entire search space of possible solutions that usually requires computationally expensive shooting methods, it is possible to search separately, e.g., independently from each other, three different solution subspaces, and select one of the three solutions as the final minimum-curvature path. In such a manner, the computational burden of the processor and the memory required for controlling the motion of the vehicle can be simplified, and the speed of the computation can be increased making the solution suitable for real-time vehicle control applications.

FIG. 2A shows a first pattern representing a minimum curvature path according to some embodiments. The first pattern corresponds to solving the dynamics (1) and (2) with Casimir constant being less than $\frac{1}{4}$. The first pattern is characterized by a forward motion of the vehicle from a first state 206 to a second state 208 while turning left followed by a backward motion of the vehicle from the second state 208 to a third state 210 while turning right, wherein the orientation of the first state 206 is opposite to the orientation of the second state 208, and wherein the orientation of the first state 206 is equal to the orientation of the third state 210. This pattern corresponds to monotonically varying values of the orientation of the vehicle.

Figure 2B:
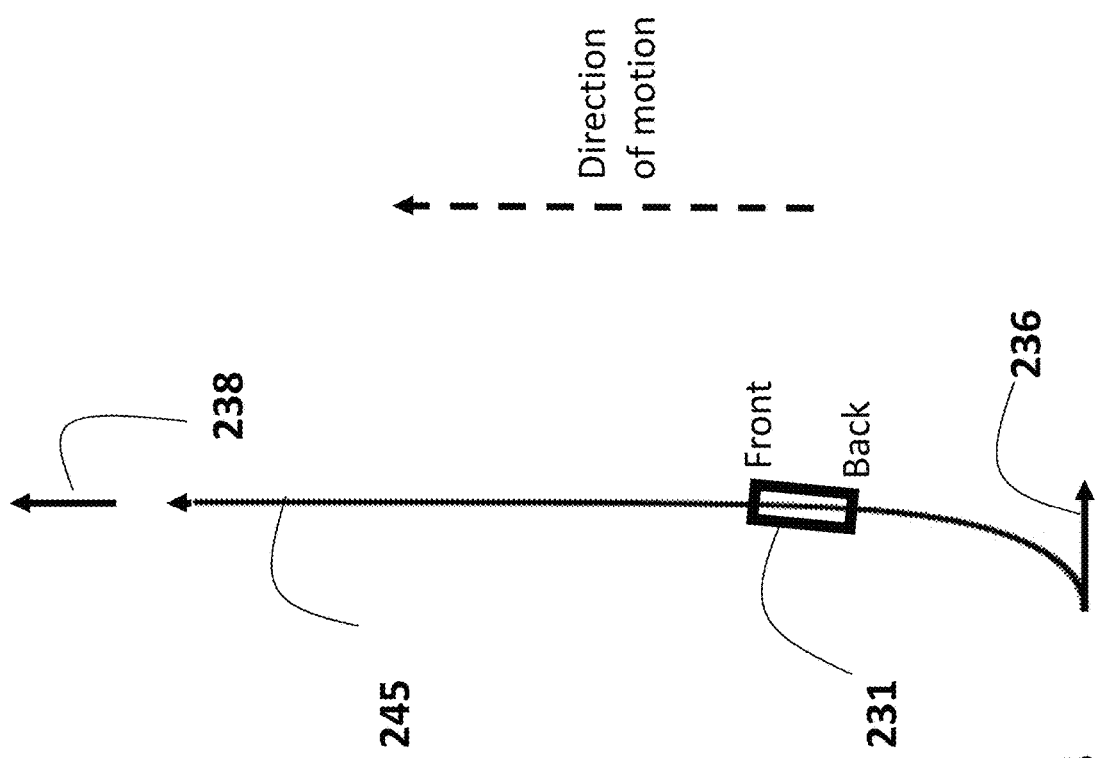
FIG. 2B shows a second pattern representing a minimum curvature path according to some embodiments.

FIG. 2B shows a second pattern representing a minimum curvature path according to some embodiments. The second pattern corresponds to solving the dynamics (1) and (2) with Casimir constant being equal to $\frac{1}{4}$. The second pattern defines the motion of the vehicle from a fourth state 236 asymptotically approaching a fifth state 238 while moving left, wherein the orientation of the fifth state 238 is leftward perpendicular to the orientation of the fourth state 236. This pattern corresponds to asymptotically varying values of the orientation of the vehicle.

Figure 2C:
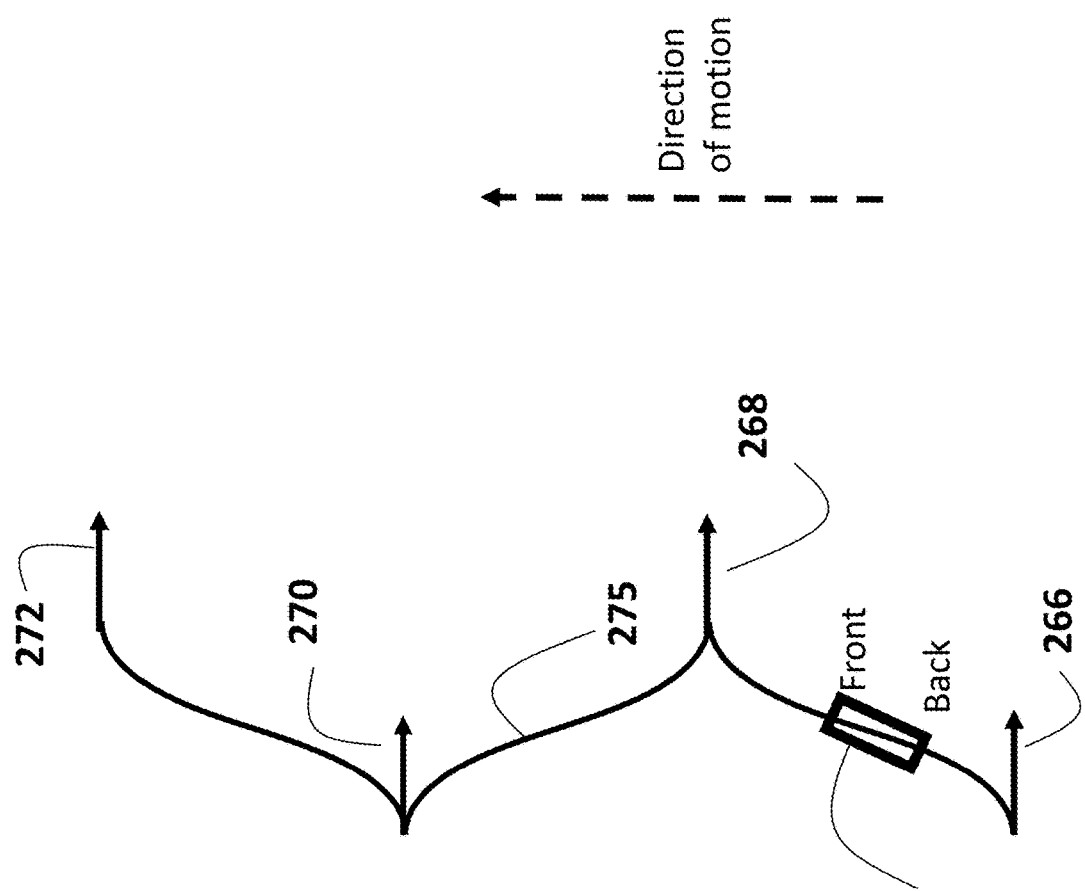
FIG. 2C shows a third pattern representing a minimum curvature path according to some embodiments.

FIG. 2C shows a third pattern representing a minimum curvature path according to some embodiments. The third pattern corresponds to solving the dynamics (1) and (2) with Casimir constant being greater than $\frac{1}{4}$. The third patter defines the forward motion of the vehicle from a sixth state 266 to a seventh state 268 while turning first left and then right followed by a backward motion of the vehicle from the seventh state 268 to an eighth state 270 while turning first right and then left follow by a forward motion of the vehicle from the eighth state 270 to a ninth state 272 while turning first left then right, wherein the orientation of the sixth state 266 equals the orientation of the seventh state 268 and equals the orientation of the eighth state 270 and equals the orientation of the ninth state 272. This pattern corresponds to periodically varying values of the orientation of the vehicle.

For example, given an initial state and target state, a path can be obtained whose time evolution adheres to the dynamics (1) and (2) for at least one value of the Casimir constant. When the Casimir is set to be less than $\frac{1}{4}$, the resulting path is a transformation of the first pattern. When the Casimir is set to equal $\frac{1}{4}$, the resulting path is a transformation of the second pattern. When the Casimir is set to be greater than $\frac{1}{4}$, the resulting path is a transformation of the third pattern. The transformation referred to herein corresponds to a translation of the pattern, a stretch or compression of the pattern along its length, a rotation of the pattern, and a flip of the pattern along its length.

Figure 3A:
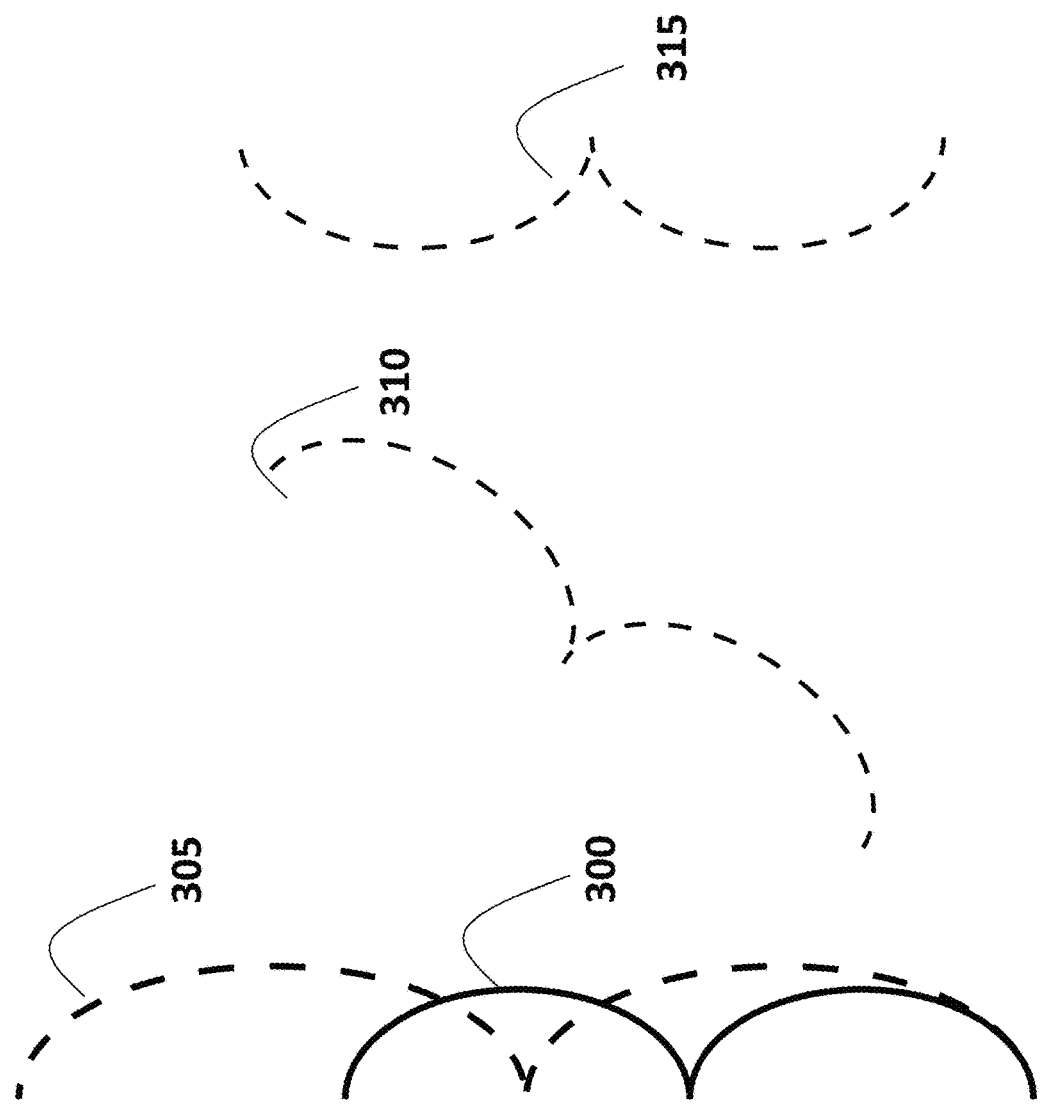
FIG. 3A shows examples of transformations of the first pattern used by some embodiments to determine the minimum-curvature path.

FIG. 3A shows examples of transformations of the first pattern used by some embodiments to determine the minimum curvature path. The transformation 305 corresponds to a stretch of pattern 300. The transformation 310 corresponds to a rotation of pattern 300. The transformation 315 corresponds to a flip of pattern 300.

FIG. 3B shows examples of transformations of the second pattern used by some embodiments to determine the minimum curvature path. The transformation 335 corresponds to a rotation of pattern 330. The transformation 340 corresponds to a flip of pattern 330. There does not exist a stretch of Pattern 2.

Figure 3C:
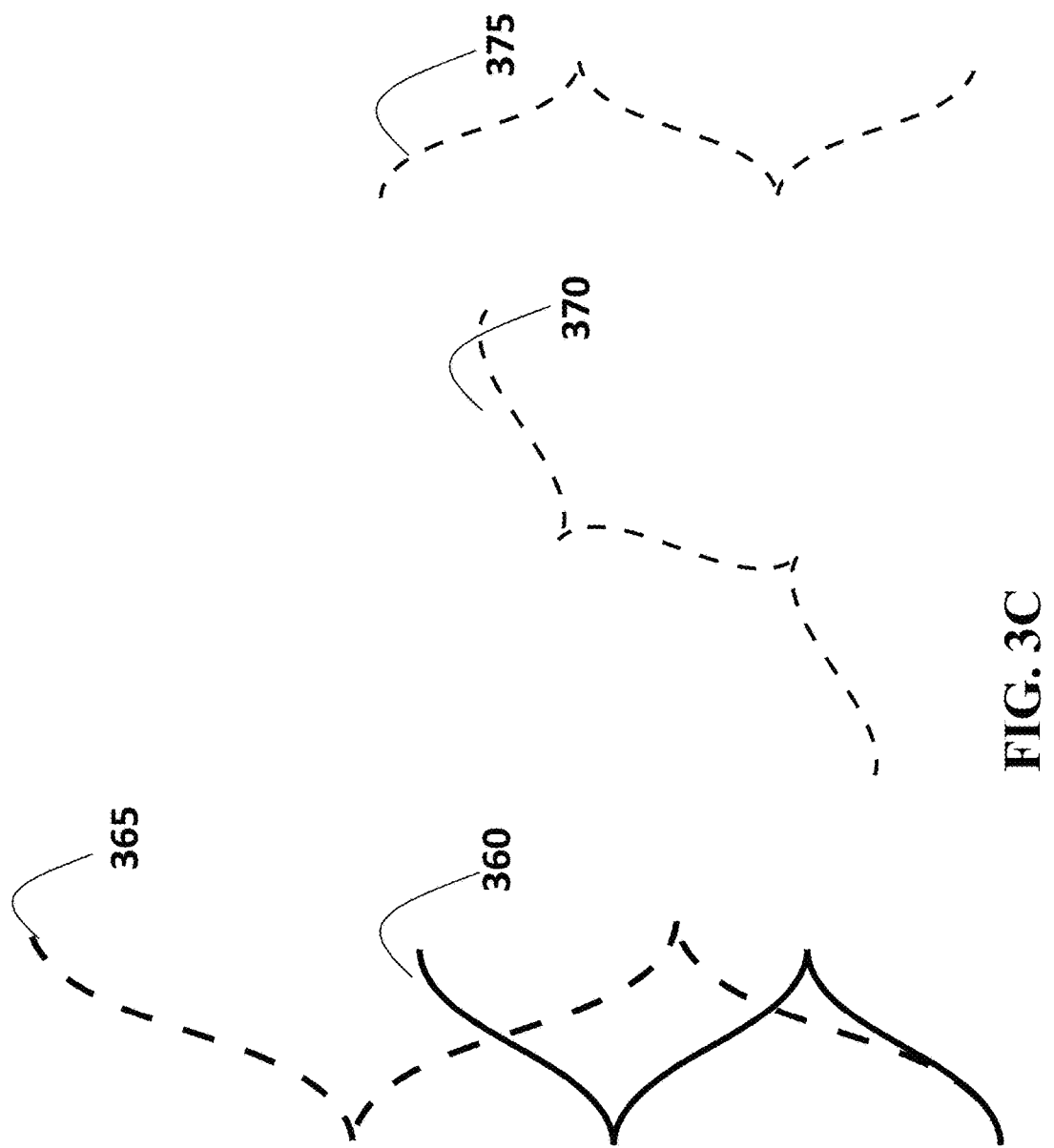
FIG. 3C shows examples of transformations of the third pattern used by some embodiments to determine the minimum-curvature path.

FIG. 3C shows examples of transformations of the third pattern used by some embodiments to determine the minimum curvature path. The transformation 365 corresponds to a stretch of pattern 360. The transformation 370 corresponds to a rotation of pattern 360. The transformation 375 corresponds to a flip of pattern 360.

Figure 3D:
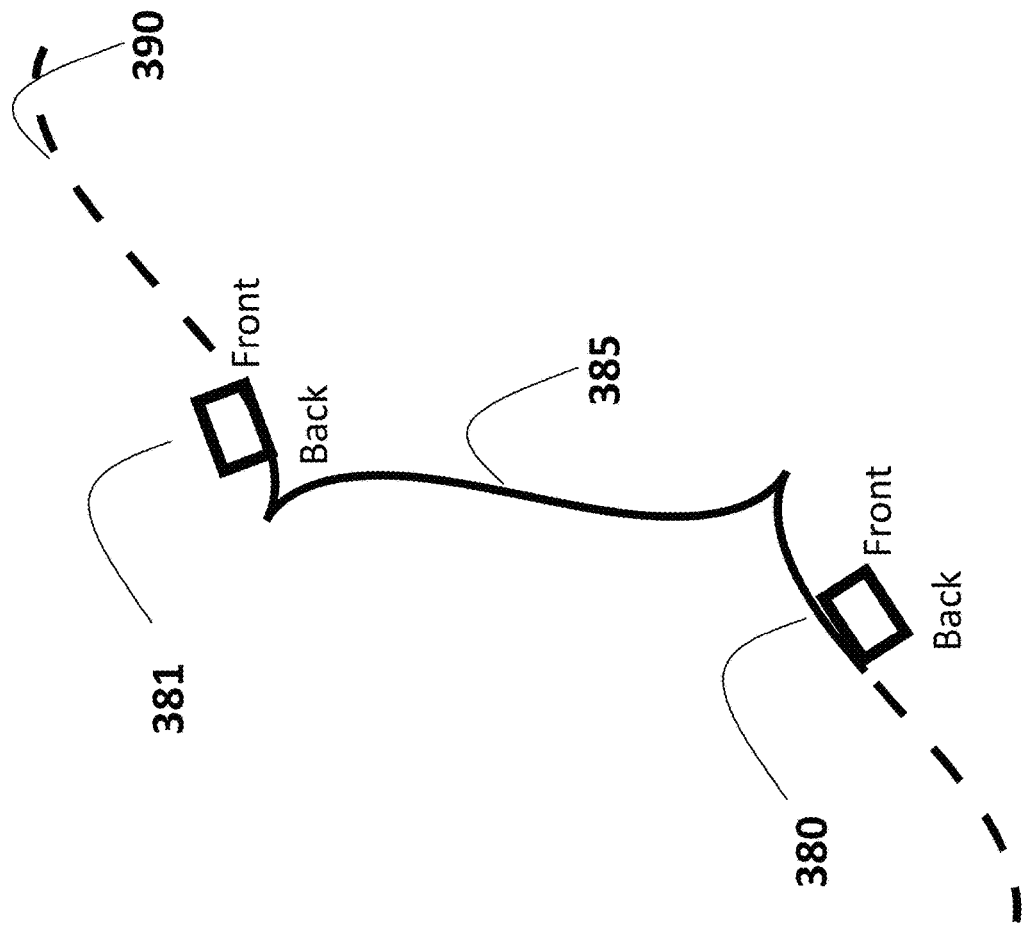
FIG. 3D shows an example of an initial vehicle configuration 380 and final vehicle configuration 381.

FIG. 3D shows an example of an initial vehicle configuration 380 and final vehicle configuration 381. The vehicle follows a path 385 that is a segment of the pattern 390, where pattern 390 is a transformation of the third pattern, where the transformation is a translation, rotation, and stretch of the third pattern.

In various embodiments, the transformations of the first, the second, and the third patterns are obtained by solving the problem of finding a path that adheres to the dynamics (1) and (2) while achieving prescribed initial and target states.

Figure 4A:
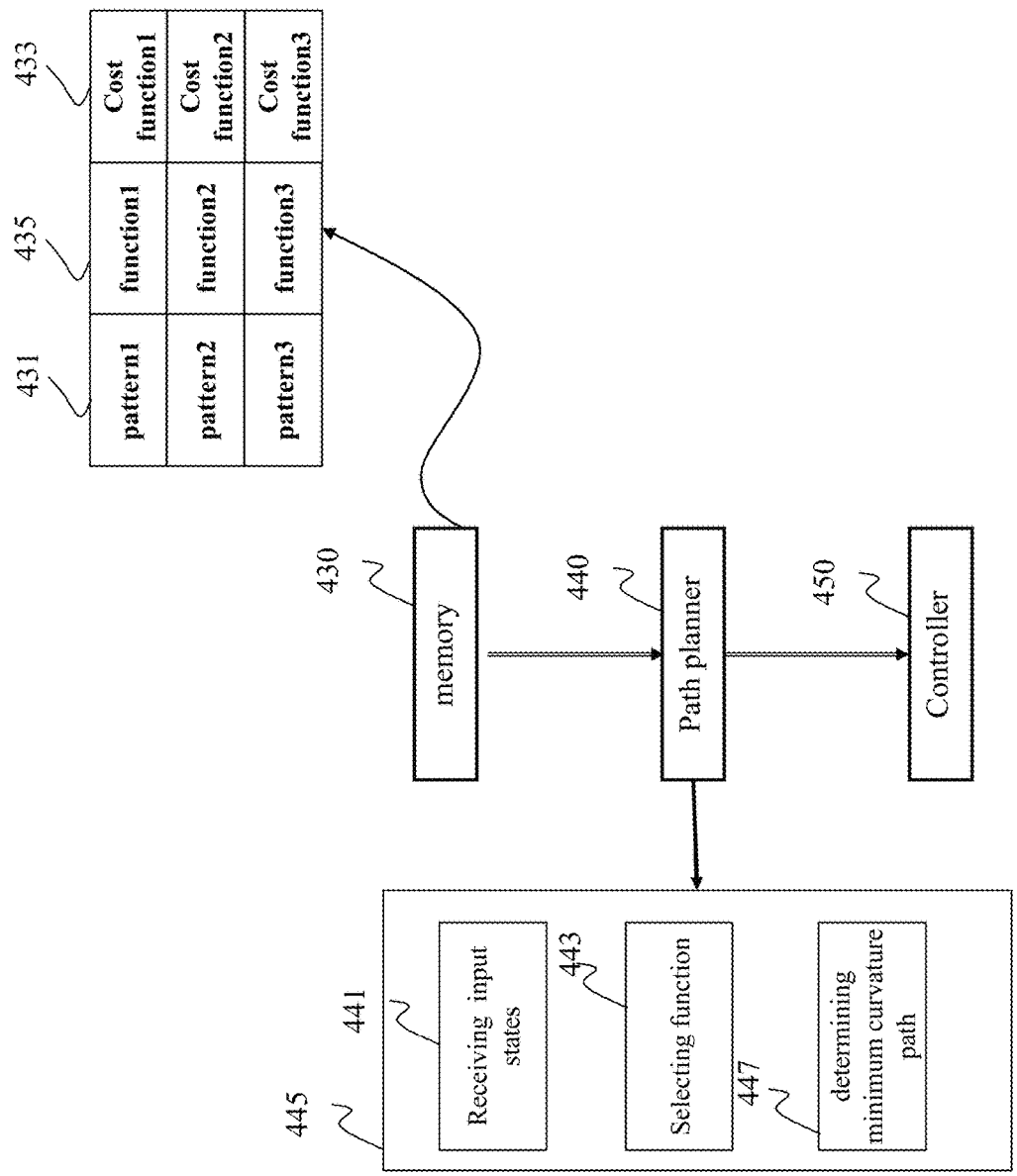
FIG. 4A shows a block diagram of a system for controlling a motion of a vehicle, according to some embodiments.

FIG. 4A shows a block diagram of a system for controlling a motion of a vehicle, according to some embodiments. The system includes a memory 430 to store a set of functions 435 corresponding to a set of patterns 431 of elementary paths. Each pattern represents a continuous path and each function is determined for a corresponding pattern to provide a solution for input states of the vehicle defining a continuous path connecting the input states by a sequential compositions of the elementary paths following the corresponding pattern.

The memory 430 can also optionally store a set of cost functions 433 corresponding to the set of patterns and/or the set of functions. The cost functions 433 allows to compute curvature of a minimum-curvature path following the corresponding pattern. The memory 430 can also optionally store the set of patterns 431 itself. Additionally or alternatively, the set of and cost function are determined for the set of patterns, but the set itself is not stored in the memory.

A path planner 440 is configured to determine 445 a minimum-curvature path connecting a pair of input states referred herein as an initial state and a target state. For example, the path planner can be implemented using a processor programmed to select 443 from the memory 430, in response to receiving 441 an initial state and a target state of the vehicle, a function corresponding to a minimum curvature of the continuous curvature path connecting the initial state with the target state and to determine 447 parameters of the minimum-curvature path using the selected function.

A controller 450 controls the motion of the vehicle according to the parameters of the minimum-curvature path. For example, the parameters of the continuous curvature path includes a sequence of coordinates of points on a plane of the motion of the vehicle forming the continuous curvature path. Additionally or alternatively, the parameters of the continuous curvature path includes a sequence of control inputs, wherein the control of the motion of the vehicle according to the sequence of control inputs transitions the states of the vehicle according to the continuous curvature path.

Figure 4B:
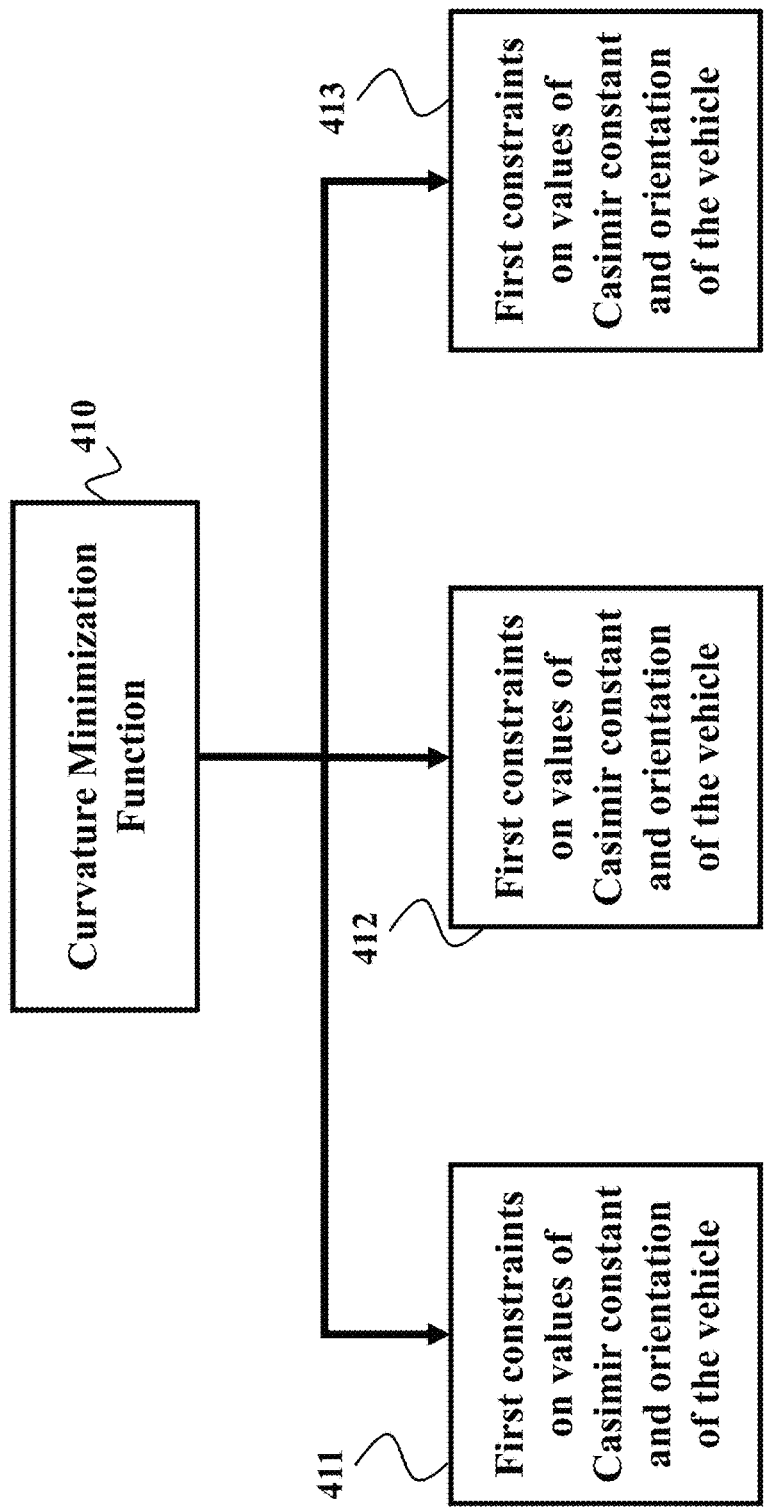
FIG. 4B shows examples of a data structure specifying different functions in the memory according to one embodiment.

FIG. 4B shows examples of a data structure specifying different functions in the memory 430 according to one embodiment. In this embodiment, the combination of the curvature minimization function 410 with different constraints 411, 412, 413 on the values of the Casimir constant and orientation of the vehicle form the set of functions 435.

For example, in one implementation, the set of functions 435 includes a first function corresponding to the first pattern searching for a first minimum-curvature path within a first search space specified by a value of the Casimir constant for the motion of the vehicle less than ¼ and monotonic values of the orientation of the vehicle. Also, the set of functions includes a second function corresponding to the second pattern searching for a second minimum-curvature path within a second search space specified by a value of the Casimir constant for the motion of the vehicle equals ¼ and asymptotic values of orientation of the vehicle. Further, the set of functions includes a third function corresponding to the third pattern searching for a third minimum-curvature path within a third search space specified by a value of the Casimir constant for the motion of the vehicle greater than ¼ and periodic values of the orientation of the vehicle.

Using the expression (3) and (4) and performing a change of variables on (1) from time t to angle θ, we obtain the differential equations $$\frac{dx}{d\theta} = f^{\pm}_{c,\theta_0}(\theta) \cos\theta \tag{5a}$$

$$\frac{dy}{d\theta} = f^{\pm}_{c,\theta_0}(\theta) \sin\theta \tag{5b}$$

with initial condition is given by $(x, y, \theta) = (0,0,0)$ where the function $$f^{\pm}_{c,\theta_0}(\theta) = \frac{\text{sign}(\sin(\theta + \theta_0))}{\pm\sqrt{1 - 2\sqrt{c}\,|\sin(\theta + \theta_0)|}} \tag{6}$$

depends on the Casimir c and two other parameters $\theta_0$ and ±. When c is less than ¼, the expression in the denominator in (6) does not change sign; therefore, as long as we know c, $\theta_0$, and ±, we can solve (5) by integrating from θ=0 to any value of θ. When c is equal to ¼, the expression in the denominator in (6) infinitesimally approaches 0 as θ approaches $$\pm\frac{\pi}{2} - \theta_0;$$

therefore, as long as we know c, $\theta_0$, and ±, we can solve (5) by integrating from θ=0 to any value of θ between $$-\frac{\pi}{2} - \theta_0 \text{ and } +\frac{\pi}{2} + \theta_0.$$

When c is greater than ¼, the expression in the denominator in (6) changes sign whenever θ equals $\pm\theta_c-\theta_0$ where $\theta_c$ is the positive solution to the equation $$1 - 2\sqrt{c}\,\sin\theta_c = 0$$

Therefore, as long as we know c, $\theta_0$, and ±, we can solve (5) by integrating from θ=0 to any value of θ between $-\theta_c-\theta_0$ and $+\theta_c-\theta_0$. Since (6) can change sign, the integration can be done by integrating θ piece-by-piece, i.e., from 0 to the final value, from 0 to $-\theta_c-\theta_0$ to the final value, from 0 to $-\theta_c-\theta_0$ to $+\theta_c-\theta_0$ to the final value, from 0 to $+\theta_c-\theta_0$ to the final value, or from 0 to $+\theta_c-\theta_0$ to $-\theta_c-\theta_0$ to the final value.

The result of the integration is shown in FIG. 3. FIG. 3A shows the solution 300 to (5) with c=0.2, $\theta_0$=0, and ±=+ integrated from θ=0 to θ=2π. FIG. 3B shows the solution 330 to (5) with c=¼, $\theta_0$=0, and ±=+ integrated from $$\theta = 0 \text{ to } \theta = \frac{\pi}{2}.$$

FIG. 3C shows the solution 360 to (5) with c=0.4, $\theta_0$=0, and ±=+ integrated from θ=0 to θ=$\theta_c$ to θ=$-\theta_c$ to θ=$+\theta_c$ to θ=0.

The solution curves can be represented by the equation, $$\gamma_c = \int f^{+}_{c,0}(\theta) \begin{bmatrix} \cos\theta \\ \sin\theta \end{bmatrix} d\theta \tag{7}$$

where the integral is taken over an appropriate range for the corresponding value of c. A substitution can verify that the following expression is a general solution to (5):

$$\begin{bmatrix} x(t) \\ y(t) \end{bmatrix} = C(\theta_0, \pm)^T (\gamma_c(\theta(t) + \theta_0) - \gamma_c(\theta_0)) \text{ where} \tag{8}$$

$$C(\theta_0, \pm)^T = \pm \begin{bmatrix} \cos\theta_0 & -\sin\theta_0 \\ \sin\theta_0 & \cos\theta_0 \end{bmatrix}$$

is a matrix representing rotations of $\gamma_c$ by $\theta_0$ and a reflection of $\gamma_c$ on the line x=0 by + (no flip) or − (flip). Therefore the determination of the minimal curvature path can be obtained by solving (8) for c, $\theta_0$, and ±, where x(t), y(t), and θ(t) are set to the desired variables x, y, and θ. The variable c, $\theta_0$, and ± correspond to a stretch/compression, a rotation, and a flip, respectively. The need to consider a translation in the solver can be avoided by translating and rotating the coordinate system and placing it so that the initial state and orientation correspond to (0,0,0).

Figure 4C:
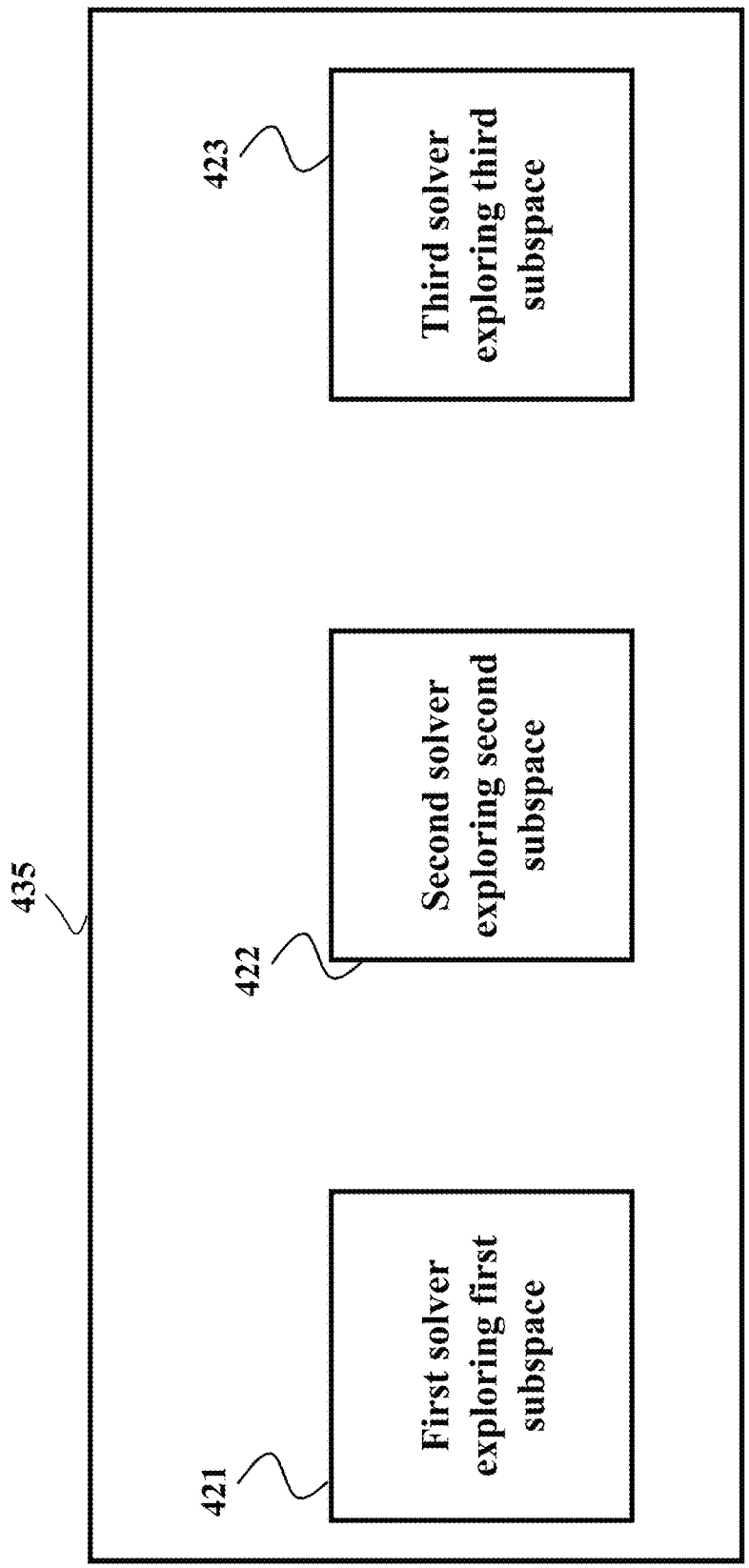
FIG. 4C shows a schematic of an exemplar data structure specifying the different functions in the memory according to another embodiment.

FIG. 4C shows a schematic of an exemplar data structure specifying the different functions in the memory 430 according to another embodiment. In this embodiment, the functions 435 are implemented as independent solvers 421, 422, and 423 exploring different subspaces of the possible solutions of the minimum curvature optimization problem, corresponding to different value of the Casimir c. In this embodiment, the path planner 440 invoke these solvers, e.g., sequentially or concurrently, to determine the minimum-curvature path.

The solvers in 421, 422, 423 solve the equation (8) for different values of the Casimir c. In the solver 421, c is restricted to be less than ¼ so the solver searches for the solution to (8) in terms of c, $\theta_0$, and ±, where c is less than ¼. The search is performed twice: once for each value of ±. In the solver 422, c is restricted to equal ¼ so the solver searches for the solution to (8) in terms of $\theta_0$ and ±, where c is equal to ¼. The search is performed twice: once for each value of ±. In the solver 423, c is restricted to be greater than ¼ so the solver searches for the solution to (8) in terms of c, $\theta_0$, and ±, where c is greater than ¼. The search is performed once for each value of ±, and once for each switch in the denominator in (6), which can happen 0, 1, or 2 times; therefore six searches are performed corresponding to this case. In each of the cases, multiple solutions may be found. Since the search is exhaustive, the solution with the minimal-curvature cost is chosen; if the costs are equal, the solutions are deemed equivalent, so one of them can be chosen.

Figure 5:
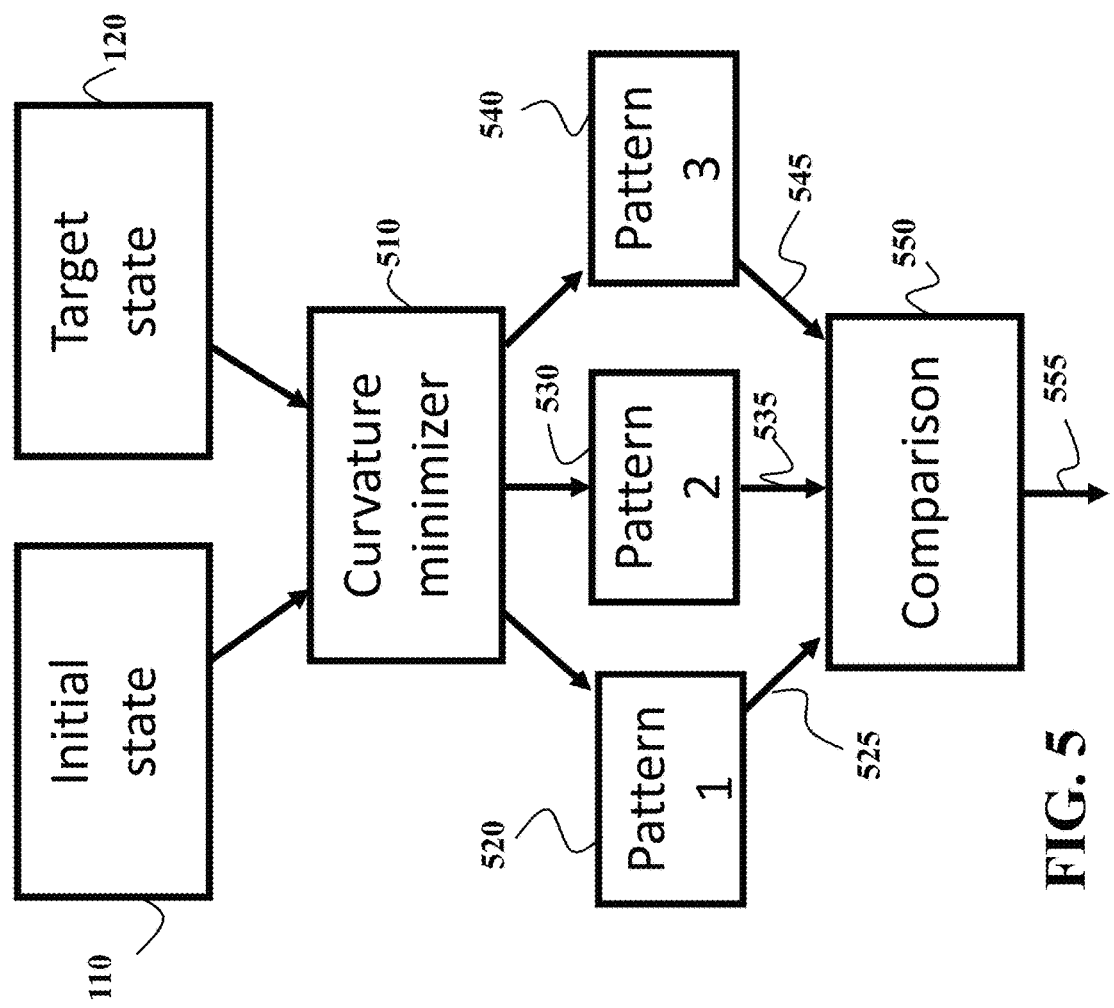
FIG. 5 shows a block diagram for the selecting the function and the determining parameters of the minimum-curvature path using the selected function according to one embodiment.

FIG. 5 shows a block diagram for the selecting the function and the determining parameters of the minimum-curvature path using the selected function according to one embodiment. Specifically, the embodiment determines minimum-curvature path following each pattern and compares the curvatures of the determined paths to select the minimum-curvature path.

For example, in response to receiver the initial state 110 and the target state 120, the embodiment determines 510, using a curvature minimizer, a first minimum-curvature path 525 represented by the first pattern 520, a second minimum-curvature path 535 represented by the second pattern 530, and a third minimum-curvature path 545 represented by the third pattern 540. Next, the embodiment compares 550 the curvatures of the first minimum-curvature path, the second minimum-curvature path, and the third minimum-curvature path to select the minimum-curvature path 555.

Figure 6:
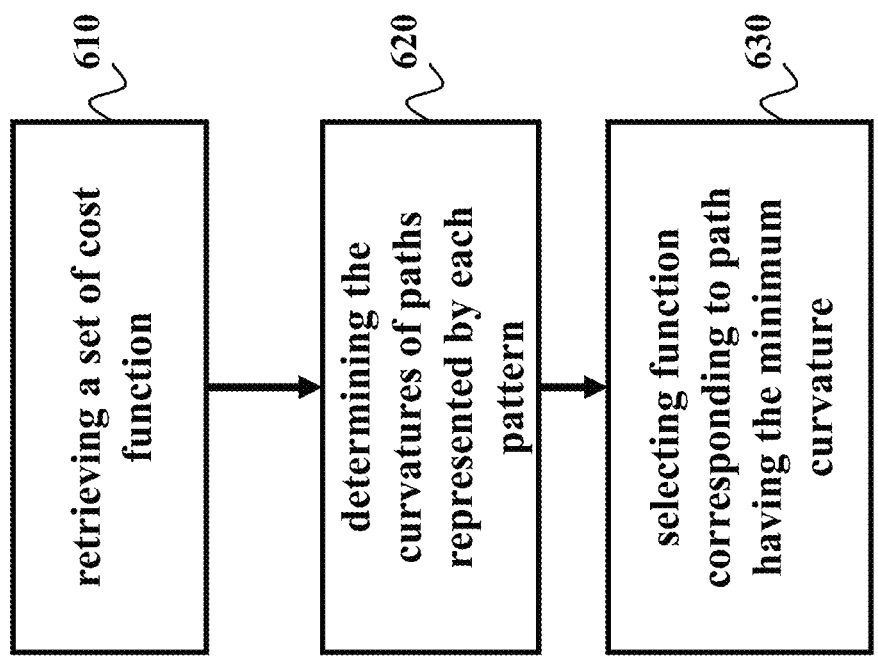
FIG. 6 shows a block diagram of selecting a function corresponding to a pattern representing minimum-curvature path according to one embodiment.

FIG. 6 shows a block diagram of selecting a function corresponding to a pattern representing minimum-curvature path according to one embodiment. In this embodiment, the memory stores a set of cost function corresponding to the set of patterns and the set of functions. Thus, the path planner can retrieve 610 a set of cost functions corresponding to the set of patterns and the set of functions and determine 620 the curvature of each pattern using the corresponding cost function. Next, the path planner can select 630 the function corresponding to the pattern having the minimal cost and use the selected function to determine the minimum-curvature path.

Figure 7:
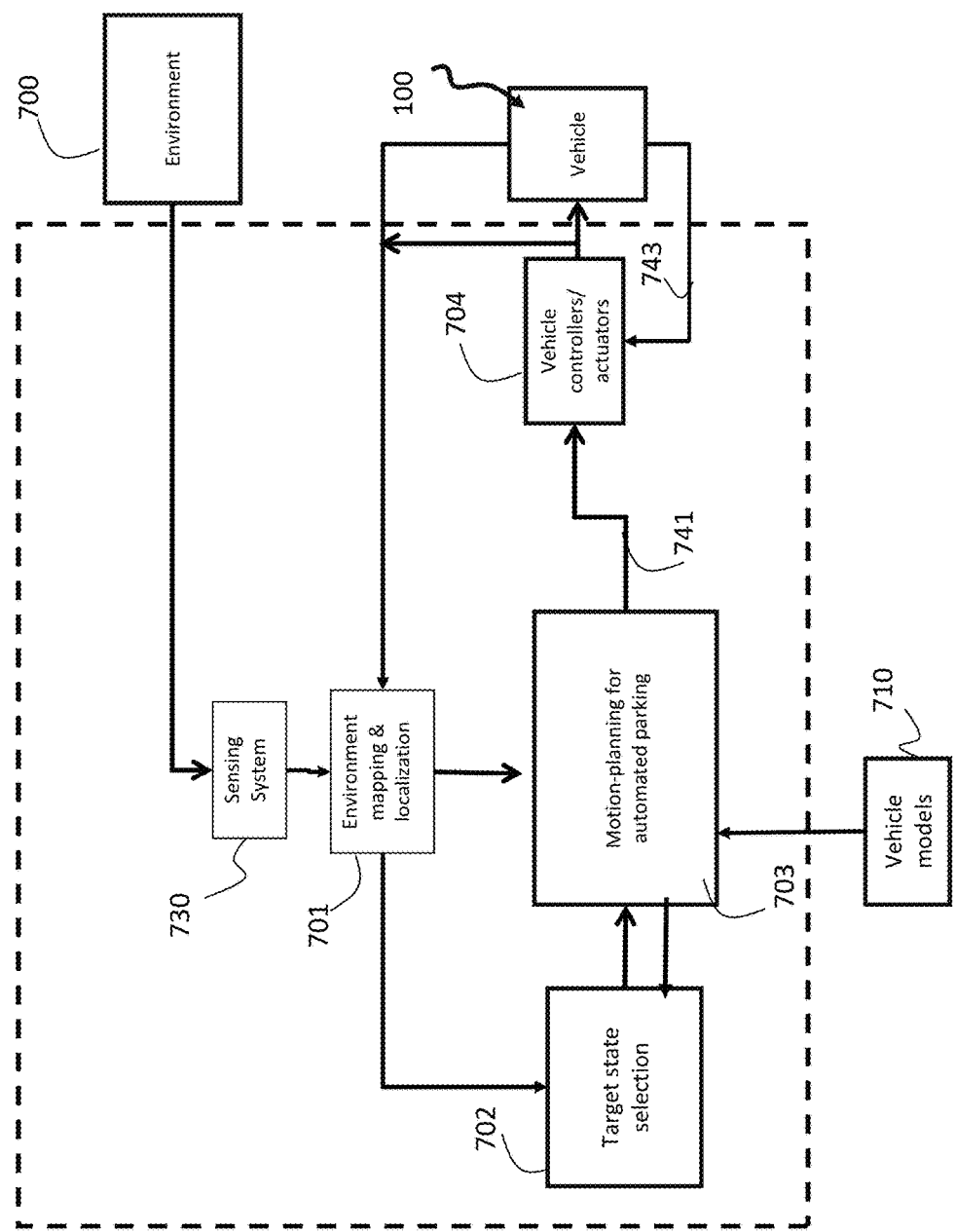
FIG. 7 shows a function diagram of an automated parking system according to one embodiment.

FIG. 7 shows a function diagram of an automated parking system according to one embodiment. Environment mapping and localization block 701 constructs or updates a map of a parking space, and determines the current location of the vehicle by sensing the environment and vehicle operation condition. For example, an inertial measurement unit, which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 700 can be video cameras capturing obstacles including other vehicles, pedestrians, and buildings, ultrasonic/radar sensors detecting distance between the vehicle and obstacles, etc. Final state selection block 701 selects a final state for a parking spot to park the vehicle by identifying parking lot candidates, and sends the final state to a motion planning block 703. In one embodiment, the available parking spots are tracked by a separate system associated with the management of the parking garage.

Additionally, or alternatively, the parking spots can be detected using the sensors 703 of the automated parking system. In one embodiment, the motion planning block checks to determine whether the final state is parkable, i.e., there is a feasible path to the parking spot, or not, and notifies the final state selection block 702 the check result. If the final state is not parkable, the target selection block 702 selects another final state for evaluation. In another embodiment, the final state selection block 701 can also evaluate whether the final state is parkable, and only sends a parkable final state to the motion planning block.

If the final state is parkable, then the motion planning 703 initiates a complete motion planning procedure to determine a reference trajectory 741 based on the vehicle models 710, the initial and final states of the vehicle, and the map of the parking space. In one embodiment, the reference trajectory defines profiles of the vehicle velocity and steer angle over time. In another embodiment, the reference trajectory defines the profile of the vehicle state (x, y, $\theta$) over time.

Given the reference trajectory 741, vehicle controllers and actuators 204 determine and exert control commands to enforce the vehicle state track the reference trajectory 741 if the reference trajectory is state profile, or to enforce the vehicle velocity and steer angle track the reference trajectory if the reference trajectory is the vehicle velocity and steer angle profiles. In one embodiment, the control commands could be gas pedal pressure or steering torque. The vehicle controller/actuators may also use signal 743 to determine control commands. The signal 743 can be a measured steering angle, or measured currents of motors moving the steering wheel or the gas pedal.

Figure 8:
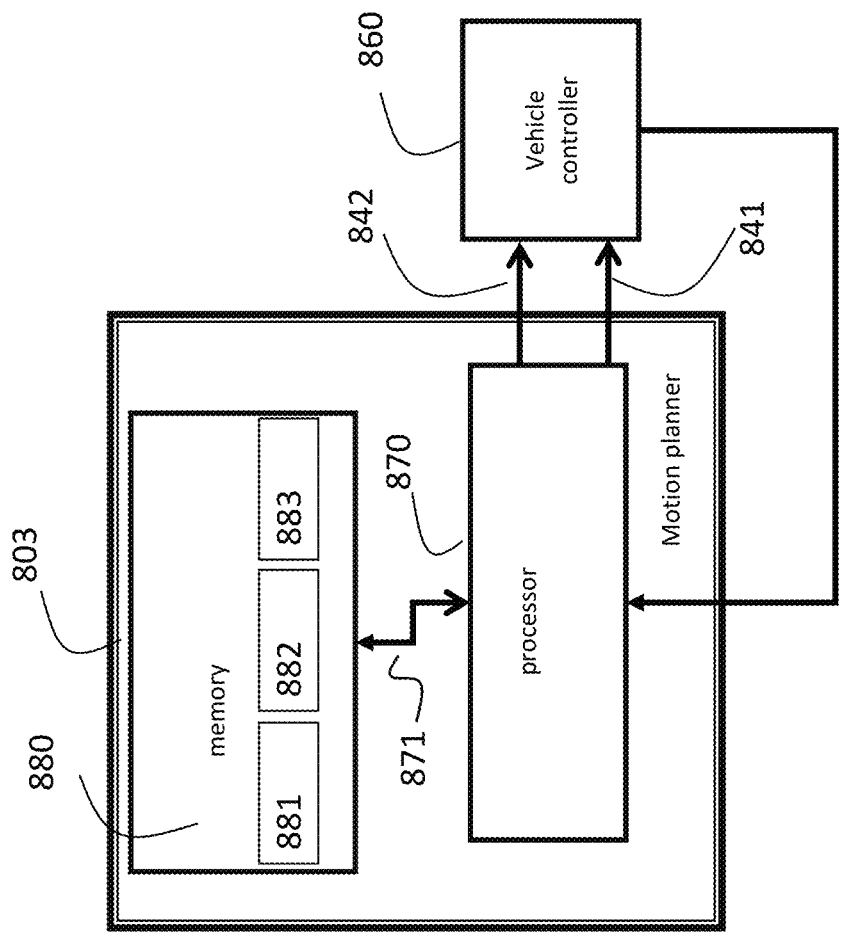
FIG. 8 shows a general structure of the motion-planning system according to one embodiment.

FIG. 8 shows a general structure of the motion-planning system 803 according to one embodiment. The motion-planning system 803 includes at least one processor 870 for executing modules of the motion-planning system 803. The processor 870 is connected 871 to a memory 880 that stores geometrical information 881 such as geometry of the vehicle and a map of the parking space. The memory 880 can also store the models of the vehicle 882 such as a kinematic model of the vehicle and a dynamic model of the vehicle. The memory 880 can also store the internal information 883 of the motion planner, including, but not limited to, an initial state of the vehicle, a final state of parked vehicle, various functions, a kinematic graph, and reference trajectories. In some embodiments, the memory 880 can include stored instructions implementing the method for the automated parking, wherein the instructions, when executed by the processor 870 carry out at least some steps of the method.

Figure 9:
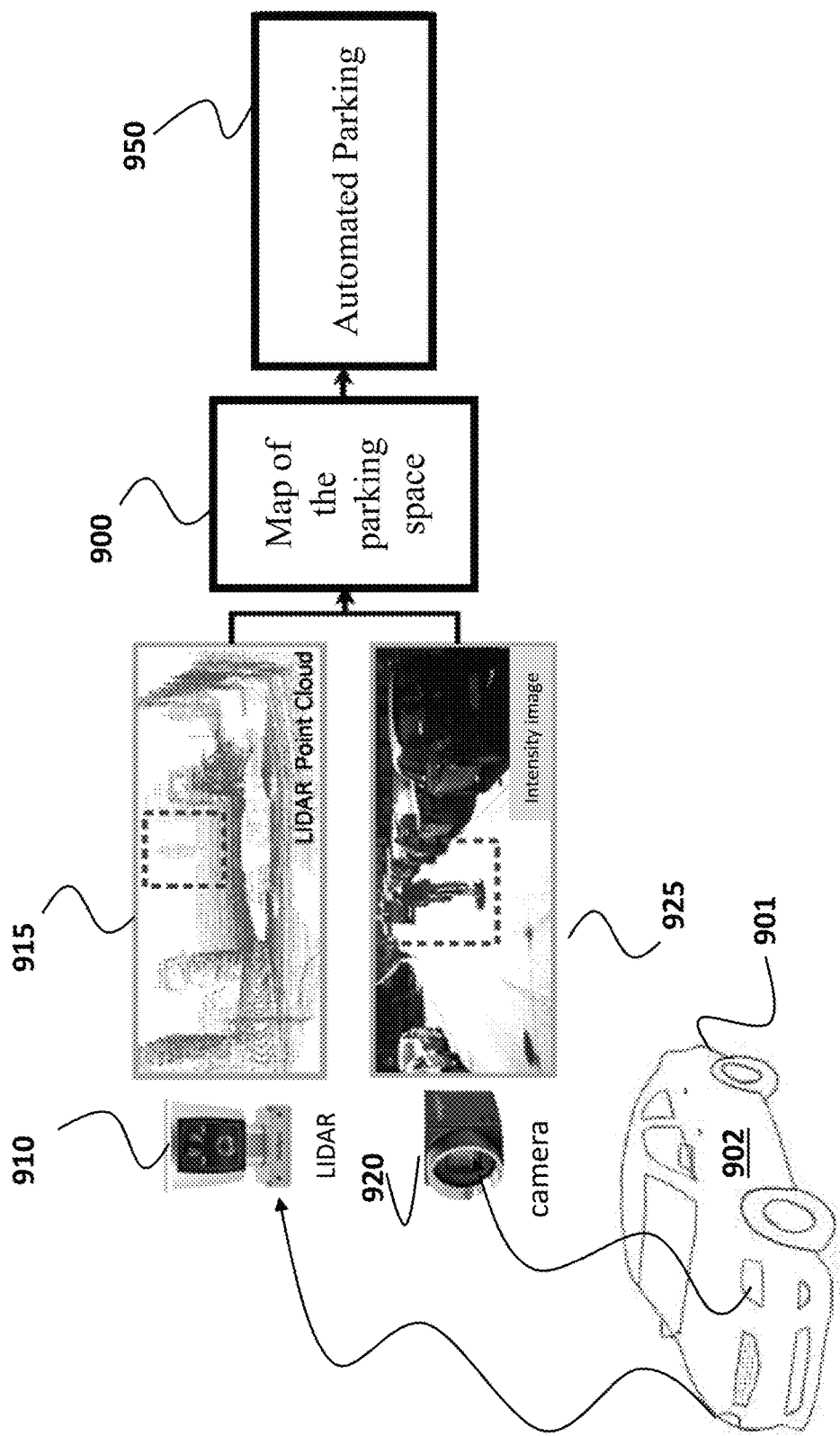
FIG. 9 shows a schematic of a system according to one embodiment.

FIG. 9 shows a schematic of a system according to one embodiment. The system include a vehicle 901 including a processor 902 configured for performing an automated parking 950. The vehicle also includes at least one sensor, such as a LIDAR 910 and/or a camera 920. The LIDAR sensor 910 is the low-resolution first sensor and the camera 920 is the high-resolution second sensor. The sensor 910 and/or 920 is operatively connected to the processor 902 and is configured for sensing information indicative of the geometry of at least part of the parking space. Using this information, the processor 902 determines and/or updates the map of the parking space 900. To that end, the processor 902 performs the automated parking 950 using the map 900.

Figure 10:
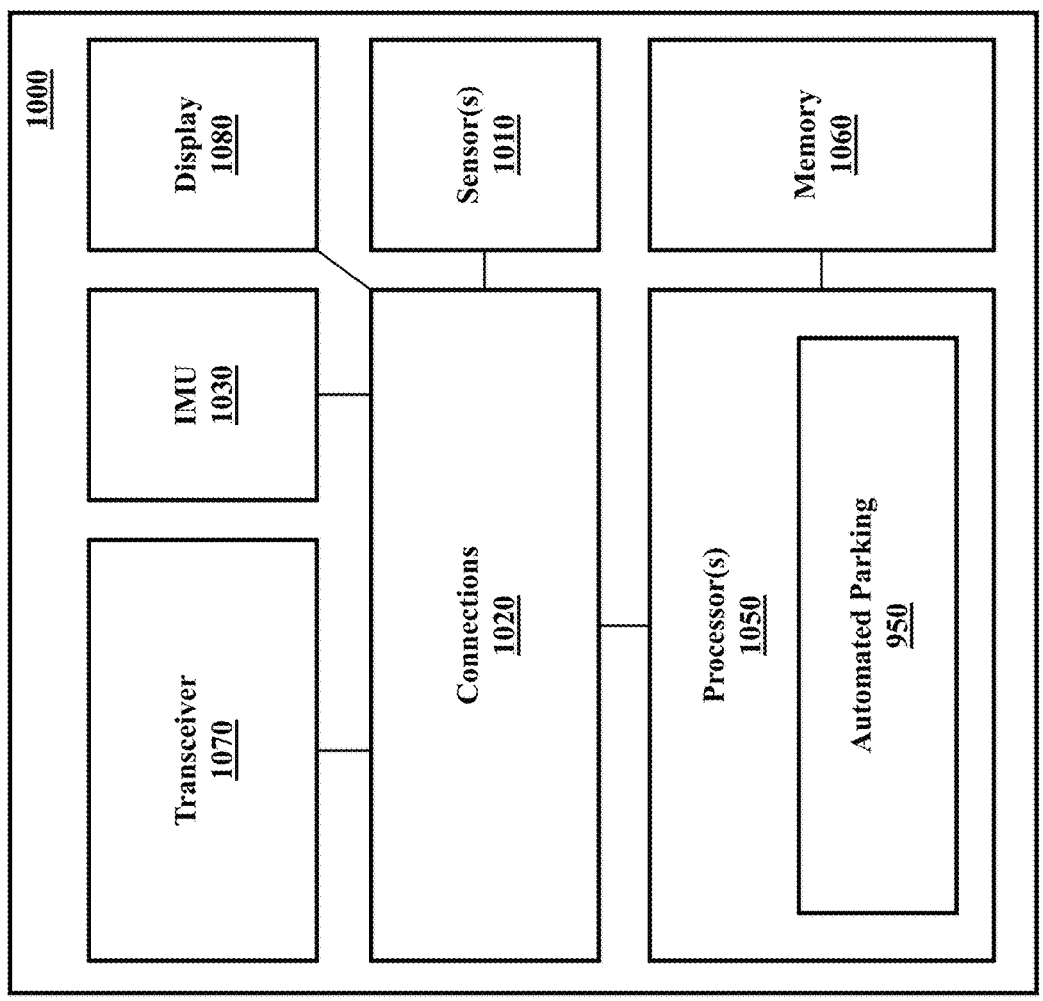
FIG. 10 shows a block diagram of an automated parking system according to some embodiments.

FIG. 10 shows a block diagram of an automated parking system 1000 according to some embodiments. The system 1000 can be implemented internal to the vehicle 901. Additionally or alternatively, the system 1000 can be communicatively connected to the vehicle 901.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking.

For example, the memory 1060 can store the measurements of the sensors, such as still images, depth information, video frames, program results, as well as data provided by the IMU 1030 and other sensors. The memory 1060 can store a memory storing a geometry of the vehicle, a map of the parking space, a kinematic model of the vehicle, and a dynamic model of the vehicle. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for controlling a motion of a vehicle, comprising:
   a memory to store a set of functions corresponding to a set of patterns of elementary paths, each pattern represents a continuous curvature path and each function is determined for a corresponding pattern to provide a solution for input states of the vehicle defining the continuous curvature path connecting the input states by a sequential compositions of the elementary paths following a transformation of the corresponding pattern, wherein the set of patterns includes a first pattern, a second pattern, and a third pattern,
   wherein the first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state,
   wherein the second pattern defines the motion of the vehicle from a fourth state to a fifth state while moving left, wherein the orientation of the fifth state is leftward perpendicular to the orientation of the fourth state, and
   wherein the third pattern defines a forward motion of the vehicle from a sixth state to a seventh state while turning first left and then right followed by a backward motion of the vehicle from the seventh state to an eighth state while turning first right and then left followed by a forward motion of the vehicle from the eight state to a ninth state while turning first left and then right, wherein the orientation of the sixth state equals the orientation of the seventh state and equals the orientation of the eighth state and equals the orientation of the ninth state;
   a path planner to select from the memory, in response to receiving an initial state and a target state of the vehicle, the function corresponding to a pattern forming the continuous curvature path connecting the initial state with the target state with the curvature less that the curvatures of the continuous curvature paths of other patterns in the set of patterns and to determine parameters of a minimum-curvature path using the selected function; and
   a controller to control the motion of the vehicle according to the parameters of the minimum-curvature path.

2. The system of claim 1, wherein the set of functions includes a first function corresponding to the first pattern searching for a first minimum-curvature path within a first search space specified by a value of the Casimir constant for the motion of the vehicle less than ¼ and monotonic values of the orientation of the vehicle, wherein the set of functions includes a second function corresponding to the second pattern searching for a second minimum-curvature path within a second search space specified by a value of the Casimir constant for the motion of the vehicle equals ¼ and asymptotic values of orientation of the vehicle, and wherein the set of functions includes a third function corresponding to the third pattern searching for a third minimum-curvature path within a third search space specified by a value of the Casimir constant for the motion of the vehicle greater than ¼ and periodic values of the orientation of the vehicle.

3. The system of claim 1, wherein the path planner determines at least one or combination of a first minimum-curvature path represented by the first pattern, a second minimum-curvature path represented by the second pattern, and a third minimum-curvature path represented by the third pattern, and compares curvatures of the first minimum-curvature path, the second minimum-curvature path, and the third minimum-curvature path to select the minimum-curvature path.

4. The system of claim 1, wherein the memory stores a set of cost function corresponding to the set of patterns and the set of functions, wherein the path planner determines the curvatures of paths represented by each pattern using the corresponding cost function and selects the function corresponding to the pattern representing the path having the minimum curvature.

5. The system of claim 1, wherein the set of patterns is an exhaustive set that guaranties that for any values of the input states, there is at least one pattern that represents a feasible continuous curvature path connecting the input states without consideration of obstacles.

6. The system of claim 1, further comprising:
a motion planner to sample a drivable state space of the vehicle, prune the sampled states to produce a sequence of states for the motion of the vehicle, and invoke the path planner for each pair of adjacent states in the sequence of states to produce a sequence of continuous curvature path s.

7. The system of claim 1, wherein the set of patterns are determined by minimizing a sum of a penalty on a time of the motion along the continuous curvature path connecting the input states and a penalty on a total curvature of the continuous curvature path connecting the input states.

8. The system of claim 7, wherein the set of patterns are determined for a Hamiltonian constant of motion with zero value and for predetermined values of Casimir constant of motion, wherein the value of the Casimir constant for the motion according to the first pattern is less than ¼, wherein the value of the Casimir constant for the motion according to the second pattern equals ¼, wherein the value of the Casimir constant the motion according to the second pattern is greater than ¼.

9. The system of claim 1, wherein the parameters of the minimum-curvature path include one or combination of a sequence of coordinates of points on a plane of the motion of the vehicle forming the minimum-curvature path and a sequence of control inputs, wherein the control of the motion of the vehicle according to the sequence of control inputs transitions the states of the vehicle according to the minimum-curvature path.

10. The system of claim 1, wherein the target state is a parking state of the vehicle with zero velocity.

11. A method for controlling a motion of a vehicle, wherein the method uses a processor coupled with stored instructions implementing the method, wherein the instructions, when executed by the processor carry out at least some steps of the method, comprising:
receiving an initial state and a target state of the vehicle;
selecting, from a set of functions corresponding to a set of patterns of elementary paths, a function corresponding to a minimum curvature of a continuous curvature path connecting the initial state with the target state, wherein each pattern represents a continuous curvature path and each function is determined for a corresponding pattern to provide a solution for input states of the vehicle defining a continuous curvature path connecting the input states by a sequential compositions of the elementary paths following a transformation of the corresponding pattern, wherein the set of patterns includes a first pattern, a second pattern, and a third pattern,
wherein the first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state,
wherein the second pattern defines the motion of the vehicle from a fourth state to a fifth state while moving left, wherein the orientation of the fifth state is leftward perpendicular to the orientation of the fourth state, and
wherein the third pattern defines a forward motion of the vehicle from a sixth state to a seventh state while turning first left and then right followed by a backward motion of the vehicle from the seventh state to an eighth state while turning first right and then left followed by a forward motion of the vehicle from the eight state to a ninth state while turning first left and then right, wherein the orientation of the sixth state equals the orientation of the seventh state and equals the orientation of the eighth state and equals the orientation of the ninth state;
determining parameters of the minimum-curvature path using the selected function; and
controlling the motion of the vehicle according to the parameters of the minimum-curvature path.

12. The method of claim 11, wherein the set of functions includes a first function corresponding to the first pattern searching for a first minimum-curvature path within a first search space specified by a value of the Casimir constant for the motion of the vehicle less than ¼ and monotonic values of the orientation of the vehicle, wherein the set of functions includes a second function corresponding to the second pattern searching for a second minimum-curvature path within a second search space specified by a value of the Casimir constant for the motion of the vehicle equals ¼ and asymptotic values of orientation of the vehicle, and wherein the set of functions includes a third function corresponding to the third pattern searching for a third minimum-curvature path within a third search space specified by a value of the Casimir constant for the motion of the vehicle greater than ¼ and periodic values of the orientation of the vehicle.

13. The method of claim 11, wherein the selecting the function and the determining parameters of the minimum-curvature path using the selected function comprises:
determining a first minimum-curvature path represented by the first pattern;

determining a second minimum-curvature path represented by the second pattern;
determining a third minimum-curvature path represented by the third pattern; and
comparing the curvatures of the first minimum-curvature path, the second minimum-curvature path, and the third minimum-curvature path to select the minimum-curvature path.

14. The method of claim 11, wherein the selecting the function comprises:
retrieving a set of cost function corresponding to the set of patterns and the set of functions;
determines the curvatures of paths represented by each pattern using the corresponding cost function; and
selecting the function corresponding to the pattern representing the path having the minimum curvature.

15. The method of claim 11, wherein the set of patterns is an exhaustive set that guaranties that for any values of the input states, there is at least one pattern that represents a feasible continuous curvature path connecting the input states without consideration of obstacles.

16. The method of claim 11, further comprising:
sampling a drivable state space of the vehicle, prune the sampled states to produce a sequence of states for the motion of the vehicle, and invoke the path planner for each pair of adjacent states in the sequence of states to produce a sequence of continuous curvature path s.

17. The method of claim 11, wherein the set of patterns are determined by minimizing a sum of a penalty on a time of the motion along the continuous curvature path connecting the input states and a penalty on a total curvature of the continuous curvature path connecting the input states.

18. The method of claim 17, wherein the set of patterns are determined for a Hamiltonian constant of motion with zero value and for predetermined values of Casimir constant of motion, wherein the value of the Casimir constant for the motion according to the first pattern is less than ¼, wherein the value of the Casimir constant for the motion according to the second pattern equals ¼, wherein the value of the Casimir constant the motion according to the second pattern is greater than ¼.

19. The method of claim 11, wherein the parameters of the minimum-curvature path include one or combination of a sequence of coordinates of points on a plane of the motion of the vehicle forming the minimum-curvature path and a sequence of control inputs, wherein the control of the motion of the vehicle according to the sequence of control inputs transitions the states of the vehicle according to the minimum-curvature path.

20. A non-transitory computer readable storage medium embodied thereon a program executable by a processor for performing a method, the method comprising:
receiving an initial state and a target state of the vehicle;
selecting, from a set of functions corresponding to a set of patterns of elementary paths, a function corresponding to a minimum curvature of a continuous curvature path connecting the initial state with the target state, wherein each pattern represents a continuous curvature path and each function is determined for a corresponding pattern to provide a solution for input states of the vehicle defining a continuous curvature path connecting the input states by a sequential compositions of the elementary paths following a transformation of the corresponding pattern, wherein the set of patterns includes a first pattern, a second pattern, and a third pattern,
wherein the first pattern defines a forward motion of the vehicle from a first state to a second state while turning left followed by a backward motion of the vehicle from the second state to a third state while turning right, wherein the orientation of the first state equals the orientation of the third state, and wherein the orientation of the first state is opposite to the orientation of the second state,
wherein the second pattern defines the motion of the vehicle from a fourth state to a fifth state while moving left, wherein the orientation of the fifth state is leftward perpendicular to the orientation of the fourth state, and
wherein the third pattern defines a forward motion of the vehicle from a sixth state to a seventh state while turning first left and then right followed by a backward motion of the vehicle from the seventh state to an eighth state while turning first right and then left followed by a forward motion of the vehicle from the eight state to a ninth state while turning first left and then right, wherein the orientation of the sixth state equals the orientation of the seventh state and equals the orientation of the eighth state and equals the orientation of the ninth state;
determining parameters of the minimum-curvature path using the selected function; and
controlling the motion of the vehicle according to the parameters of the minimum-curvature path.

* * * * *